(12) United States Patent
Koga

(10) Patent No.: US 10,502,877 B2
(45) Date of Patent: Dec. 10, 2019

(54) OPTICAL FILTER AND OPTICAL SYSTEM, IMAGE PICKUP APPARATUS, AND LENS APPARATUS WHICH INCLUDE THE SAME

(71) Applicant: CANON KABUSHIKI KAISHA, Tokyo (JP)

(72) Inventor: Hironobu Koga, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/580,345

(22) PCT Filed: Aug. 3, 2016

(86) PCT No.: PCT/JP2016/003577
§ 371 (c)(1),
(2) Date: Dec. 7, 2017

(87) PCT Pub. No.: WO2017/029781
PCT Pub. Date: Feb. 23, 2017

(65) Prior Publication Data
US 2018/0164479 A1   Jun. 14, 2018

(30) Foreign Application Priority Data

Aug. 19, 2015   (JP) .................................. 2015-161627
May 25, 2016   (JP) .................................. 2016-103855

(51) Int. Cl.
*G02B 5/20*   (2006.01)
*G02B 1/11*   (2015.01)
(Continued)

(52) U.S. Cl.
CPC ................. *G02B 5/20* (2013.01); *G02B 1/11* (2013.01); *G02B 5/205* (2013.01); *G02B 5/22* (2013.01);
(Continued)

(58) Field of Classification Search
CPC .......... G02B 5/20; G02B 5/205; G02B 5/206; G02B 5/208; G02B 5/22; G02B 5/005;
(Continued)

(56) References Cited

U.S. PATENT DOCUMENTS 7,036,942 B2   5/2006 Ogawa
7,507,478 B2   3/2009 Maschwitz
(Continued)

FOREIGN PATENT DOCUMENTS

CN   1472550 A   2/2004
CN   1564963 A   1/2005
(Continued)

OTHER PUBLICATIONS

International Search Report issued in Intl. Appln. No. PCT/JP2016/003577 dated Nov. 8, 2016.
(Continued)

*Primary Examiner* — Jie Lei
(74) *Attorney, Agent, or Firm* — Rossi, Kimms & McDowell LLP

(57) ABSTRACT

An optical filter that has a region where a transmittance changes in a first direction and that includes a substrate and a first layer in order along a second direction orthogonal to the first direction, a thickness of the first layer in the second direction changes in the first direction, and an extinction coefficient of the first layer satisfies a predetermined conditional expression.

20 Claims, 16 Drawing Sheets

(51) Int. Cl.
*G03B 11/00* (2006.01)
*G02B 5/22* (2006.01)
*H04N 5/225* (2006.01)

(52) U.S. Cl.
CPC ............ *G03B 11/00* (2013.01); *H04N 5/2253* (2013.01); *H04N 5/2254* (2013.01)

(58) Field of Classification Search
CPC .... G02B 5/223; G02B 27/58; G02B 27/0927; G02B 1/11; H04N 5/2254; H04N 5/225; H04N 5/238; H04N 5/2253; G03B 11/00
USPC ....... 359/359, 577, 580, 586, 888, 889, 885, 359/891; 348/360–363
See application file for complete search history.

(56) References Cited

U.S. PATENT DOCUMENTS

| | | | |
|---|---|---|---|
| 7,736,742 B2 | 6/2010 | Thomas et al. | |
| 7,833,629 B2 * | 11/2010 | Anderson ........... | C03C 17/3417 428/432 |
| 7,993,744 B2 | 8/2011 | Maschwitz | |
| 8,137,742 B2 | 3/2012 | Maschwitz | |
| 8,665,520 B2 | 3/2014 | Uchiyama | |
| 9,753,299 B2 | 9/2017 | Ishido | |
| 2003/0086014 A1 | 5/2003 | Murata | |
| 2003/0104187 A1 | 6/2003 | Nishida et al. | |
| 2005/0186482 A1 | 8/2005 | Maschwitz | |
| 2006/0068226 A1 | 3/2006 | Kunii | |
| 2015/0192783 A1 | 7/2015 | Ishido et al. | |
| 2018/0372918 A1 | 12/2018 | Koga | |

FOREIGN PATENT DOCUMENTS

| | | | |
|---|---|---|---|
| CN | 1960860 | A | 5/2007 |
| CN | 102692662 | A | 9/2012 |
| CN | 103592714 | A | 2/2014 |
| CN | 104246544 | A | 12/2014 |
| JP | H09073001 | A | 3/1997 |
| JP | 2005084474 | A | 3/2005 |
| JP | 2006308810 | A | 11/2006 |
| JP | 2007178822 | A | 7/2007 |
| JP | 2009175225 | A | 8/2009 |
| JP | 2011118251 | A | 6/2011 |
| JP | 5067133 | B2 | 8/2012 |
| JP | 2013156619 | A | 8/2013 |
| WO | 2017150489 | A1 | 9/2017 |

OTHER PUBLICATIONS

Written Opinion issued in Intl. Appln. No. PCT/JP2016/003577 dated Nov. 8, 2016.
Partial Supplementary European Search Report issued in European Appln. No. 16836779.5 dated Dec. 20, 2018.
Extended European Search Report issued in European Appln. No. 16836779.5 dated Mar. 19, 2019.
Office Action issued in Chinese Appln. No. 201680048341.3 dated Sep. 29, 2019. English translation provided.

* cited by examiner

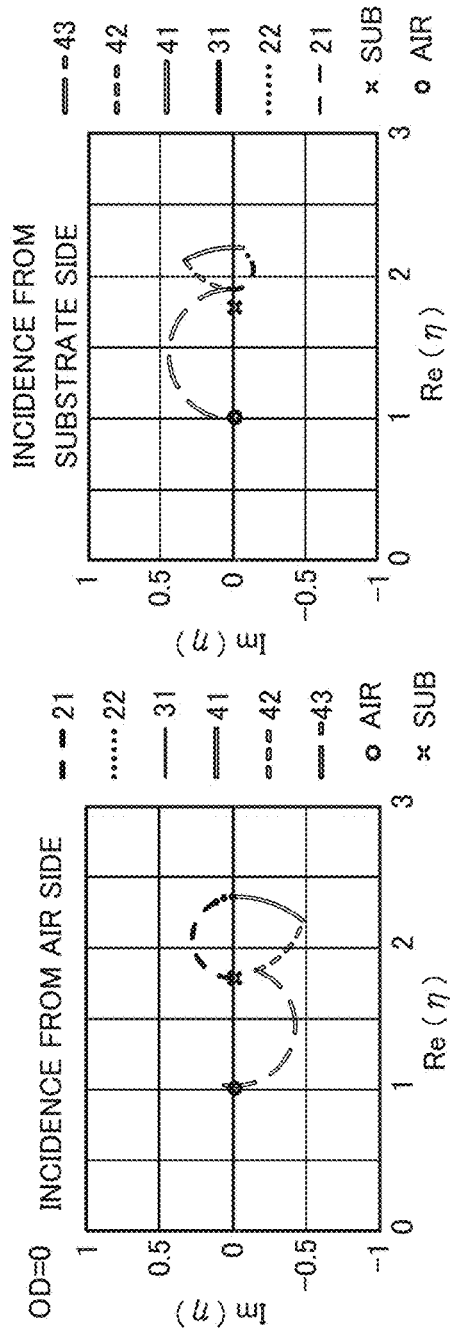
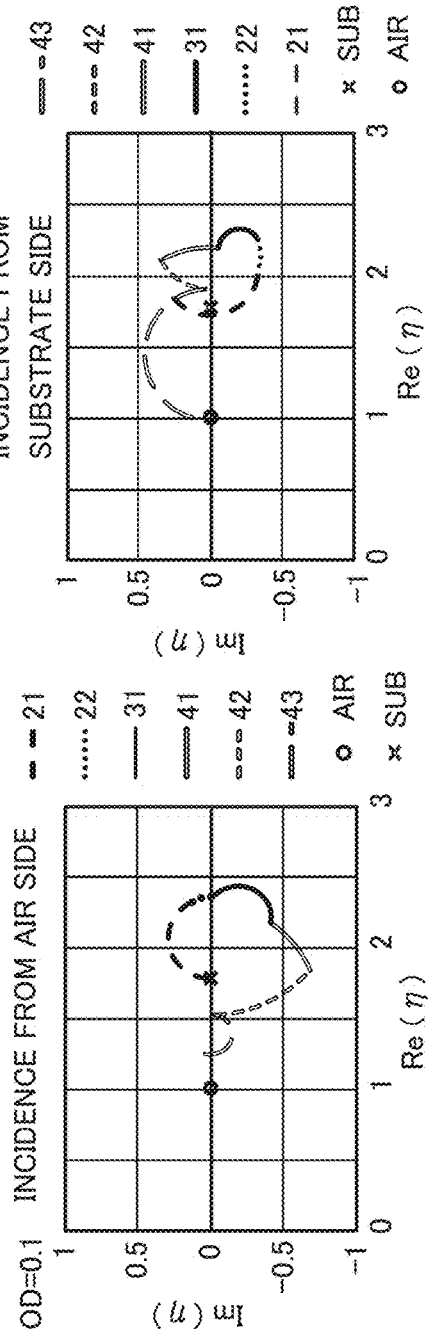
FIG. 3A
FIG. 3B

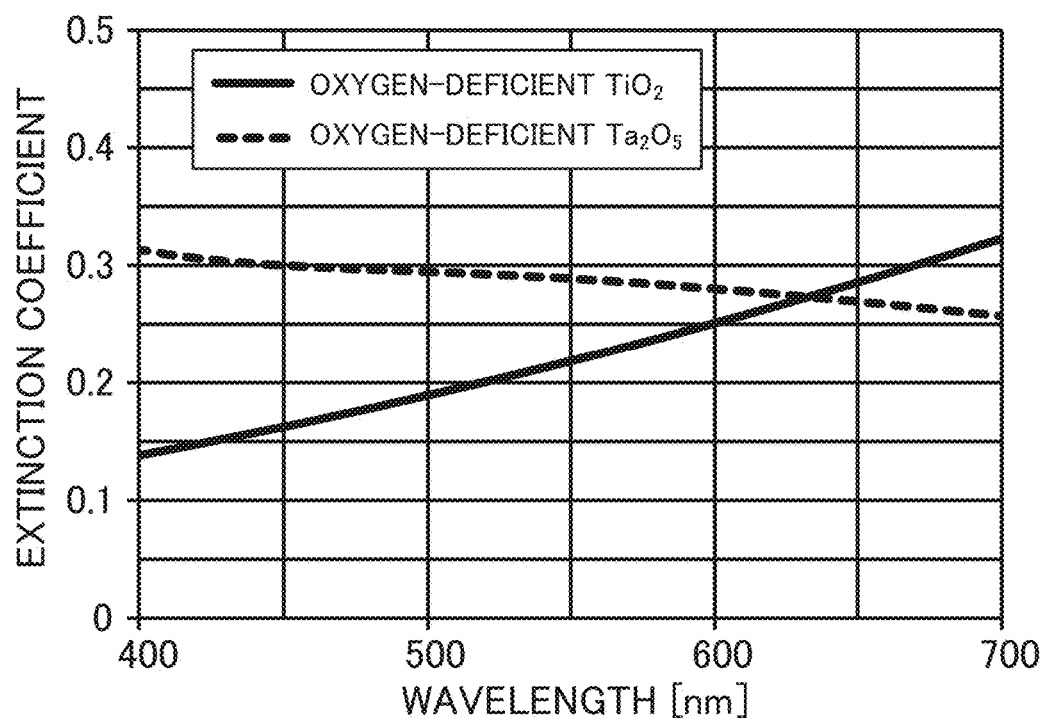
FIG. 14
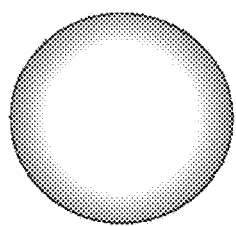
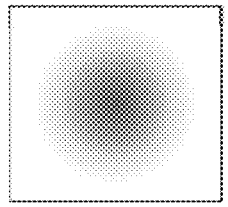
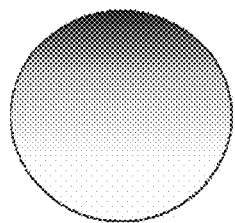
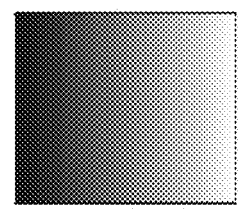
FIG. 15A   FIG. 15B   FIG. 15C   FIG. 15D

OPTICAL FILTER AND OPTICAL SYSTEM, IMAGE PICKUP APPARATUS, AND LENS APPARATUS WHICH INCLUDE THE SAME

TECHNICAL FIELD

The present invention relates to an optical filter.

BACKGROUND ART

As an optical filter in an image pickup apparatus, an ND (Neutral Density) filter that limits a transmittance may be used. In particular, in order to control a brightness of an image arbitrarily or improve (a decrease of a quality of the image caused by) variation of sharpness of an edge of an out-of-focus image (blurred image), a gradation ND filter that has a transmittance which gradually varies depending on a region in an optical plane is used.

PTL 1 discloses a gradation ND filter which controls a transmittance and a reflectance according to a film thickness of a laminated film for each region. PTL 2 discloses an ND filter which reduces the reflectance by using an antireflection structure.

CITATION LIST

Patent Literature

[PTL 1] Japanese Patent Laid-open No. 2007-178822
[PTL 2] Japanese Patent No. 5067133

SUMMARY OF INVENTION

Technical Problem

In the ND filter disclosed in PTL 1, the reflectance of a visible light region is reduced to be not greater than 5% within a range of an optical density from 0.1 to 1. However, in order to obtain a high-quality image without ghost and flare, it is necessary to further reduce the reflectance. In the ND filter disclosed in PTL 2, the reflectance of the ND filter is reduced to be not greater than 1%. However, PTL 2 does not disclose a structure relating to the gradation ND filter and an antireflection effect. Typically, it is not easy to manufacture an antireflection structure and there is a possibility that the antireflection structure is collapsed, and accordingly the antireflection structure cannot be touched.

When the ND filter is configured to absorb unnecessary light, its reflectance varies depending on an incident direction of the light from a surface side or from a substrate side. However, neither PTL 1 nor PTL 2 discloses the reflectance for the incident light from the substrate side.

The present invention provides an optical filter, an optical system, an image pickup apparatus, and a lens apparatus that are easily manufactured and that have a high antireflection performance for regions with different transmittances.

Solution to Problem

An optical filter as one aspect of the present invention has a region where a transmittance changes in a first direction and includes a substrate and a first layer in order along a second direction orthogonal to the first direction, a thickness of the first layer in the second direction changes in the first direction, and an extinction coefficient of the second layer satisfies a predetermined conditional expression.

An optical system as another aspect of the present invention includes a plurality of optical elements including the optical filter.

An image pickup apparatus as another aspect of the present invention includes the optical system and an image sensor configured to photoelectrically convert an optical image formed via the optical system to output image data.

A lens apparatus as another aspect of the present invention is removably attached to an image pickup apparatus body and includes the optical system.

Further features of the present invention will become apparent from the following description of exemplary embodiments with reference to the attached drawings.

Advantageous Effects of Invention

According to the present invention, an optical filter, an optical system, an image pickup apparatus, and a lens apparatus that are easily manufactured and that have a high antireflection performance for regions with different transmittances can be provided.

BRIEF DESCRIPTION OF DRAWINGS

FIG. 3A is an admittance trajectory diagram of the optical filter in Embodiment 1.

FIG. 3B is an admittance trajectory diagram of the optical filter in Embodiment 1.

FIG. 14 is a diagram of illustrating a wavelength characteristic of the extinction coefficient of the absorption layer in each embodiment.

FIG. 15A is a diagram of illustrating the transmittance distribution of the optical filter in each embodiment.

FIG. 15B is a diagram of illustrating the transmittance distribution of the optical filter in each embodiment.

FIG. 15C is a diagram of illustrating the transmittance distribution of the optical filter in each embodiment.

FIG. 15D is a diagram of illustrating the transmittance distribution of the optical filter in each embodiment.

DESCRIPTION OF EMBODIMENTS

Figure 1A:
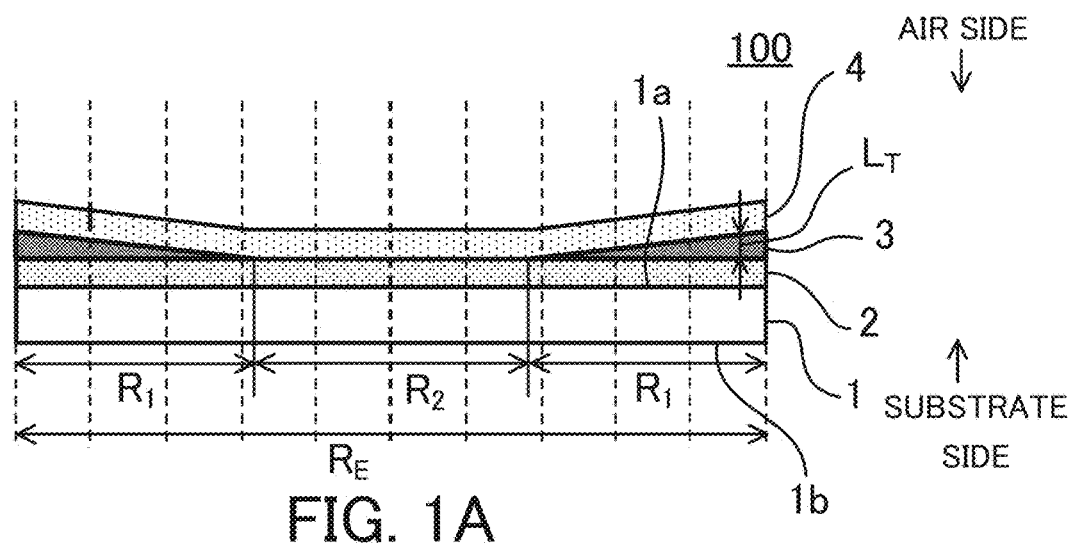
FIG. 1A is a schematic diagram (cross-sectional view) of an optical filter in Embodiment 1.

Exemplary embodiments of the present invention will be described below with reference to the accompanied drawings. In each of the drawings, the same elements will be denoted by the same reference numerals and the duplicate descriptions thereof will be omitted.

First, referring to FIGS. 1A to 1C, a configuration of an optical filter in an embodiment (Embodiment 1) of the present invention will be described. FIG. 1A is a schematic diagram (cross-sectional view) of an optical filter 100 in this embodiment. The optical filter 100 includes a substrate 1, an intermediate antireflection layer (intermediate layer) 2, an absorption layer (first layer) 3, and a surface antireflection layer (second layer) 4. In other words, in the optical filter 100, the intermediate antireflection layer 2, the absorption layer 3, and the surface antireflection layer 4 are formed in this order on a surface (first surface) 1a of the substrate 1. In the optical filter 100, on a surface (second surface) 1b opposite to the surface 1a of the substrate 1, the laminated structure similar to that of the surface 1a described above may be provided or an antireflection film may be provided as appropriate (not illustrated). In this embodiment, each of the intermediate antireflection layer 2 and the surface antireflection layer 4 is constituted by a film including at least one layer. In order to adjust a refractive index, enlarge an antireflection band, reduce incident angle dependence, or reduce polarization dependence, the number of the laminated layers of each antireflection layer (intermediate antireflection layer 2 or surface antireflection layer 4) may be increased.

As illustrated in FIG. 1A, in a region $R_1$ (region in an in-plane direction (horizontal direction of FIG. 1A)) where a transmittance of the optical filter 100 continuously changes, a thickness $L_T$ (thickness in a vertical direction of FIG. 1A) of the absorption layer 3 continuously changes. The absorption layer 3 is not formed in a region $R_2$ where the transmittance is constant. On the other hand, in an entire region $R_E$ of the optical filter 100, each of the intermediate antireflection layer 2 and the surface antireflection layer 4 is constituted by a film having an approximately-uniform (i.e., uniform or substantially-uniform) thickness. The film having the approximately-uniform thickness (approximately-constant thickness) includes a film which changes in thickness caused by minute asperities depending on a particle size of a material of the laminated layer or a density of the laminated layer, or a film which changes in thickness that is formed unintentionally caused by a difference of turning radii of a center and an edge on the same substrate with reference to a rotation axis of the formation of the film.

Figure 1B:
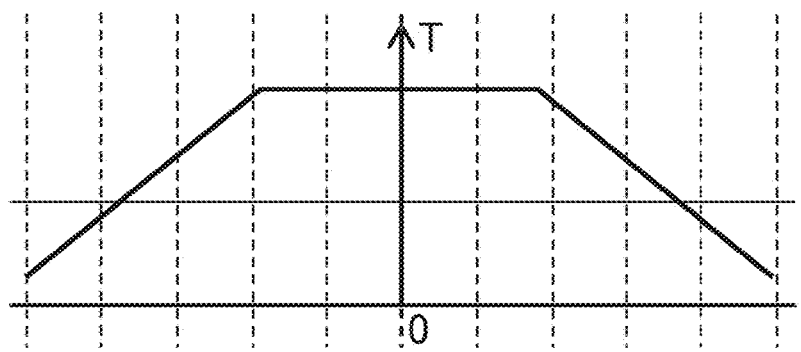
FIG. 1B is a diagram of illustrating a transmittance distribution in each region of the optical filter in Embodiment 1.

FIG. 1B is a diagram of illustrating a transmittance distribution in each region of the optical filter 100, and a vertical axis and a horizontal axis indicate a transmittance T and a region (position in the in-plane direction) of the optical filter 100, respectively. The optical filter 100 is configured to change the transmittance T depending on a thickness of the absorption layer 3, and the thickness of the absorption layer 3 continuously changes to achieve a gradation ND filter. As illustrated in FIG. 1B, the transmittance T is decreased with increasing the thickness of the absorption layer 3.

Figure 1C:
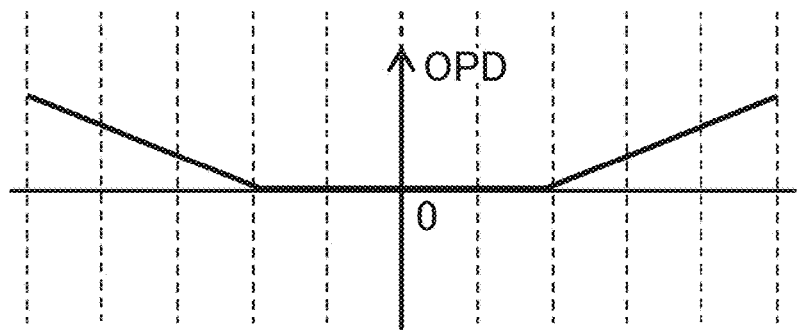
FIG. 1C is a diagram of illustrating a distribution of an optical path difference of the optical filter in Embodiment 1.

FIG. 1C is a diagram of illustrating a distribution of an optical path difference of the optical filter 100, and the vertical axis and the horizontal axis indicate an optical path difference OPD and the region (position in the in-plane direction) of the optical filter 100, respectively. In FIG. 1C, the optical path difference OPD is an optical path difference between a center position and a peripheral position of the optical filter 100 (substrate 1). Since the optical filter 100 has a distribution in thickness of the absorption layer 3, as illustrated in FIG. 1C, the optical path difference OPD varies depending on the region (position in the in-plane direction).

Typically, when the thickness of the absorption layer 3 is changed as illustrated in FIG. 1A to obtain the gradation ND filter (optical filter), the reflectance significantly changes depending on the change of the thickness of the absorption layer 3. Accordingly, it is difficult to reduce the reflectance in the entire region of the optical filter in the in-plane direction. On the other hand, according to the optical filter 100 of this embodiment, the reflectance can be reduced in the entire region in the in-plane direction in each of cases where light is incident from an air side (i.e., from the surface antireflection layer 4) and it is incident from a substrate side (i.e., from the surface 1a of the substrate 1).

Figure 2:
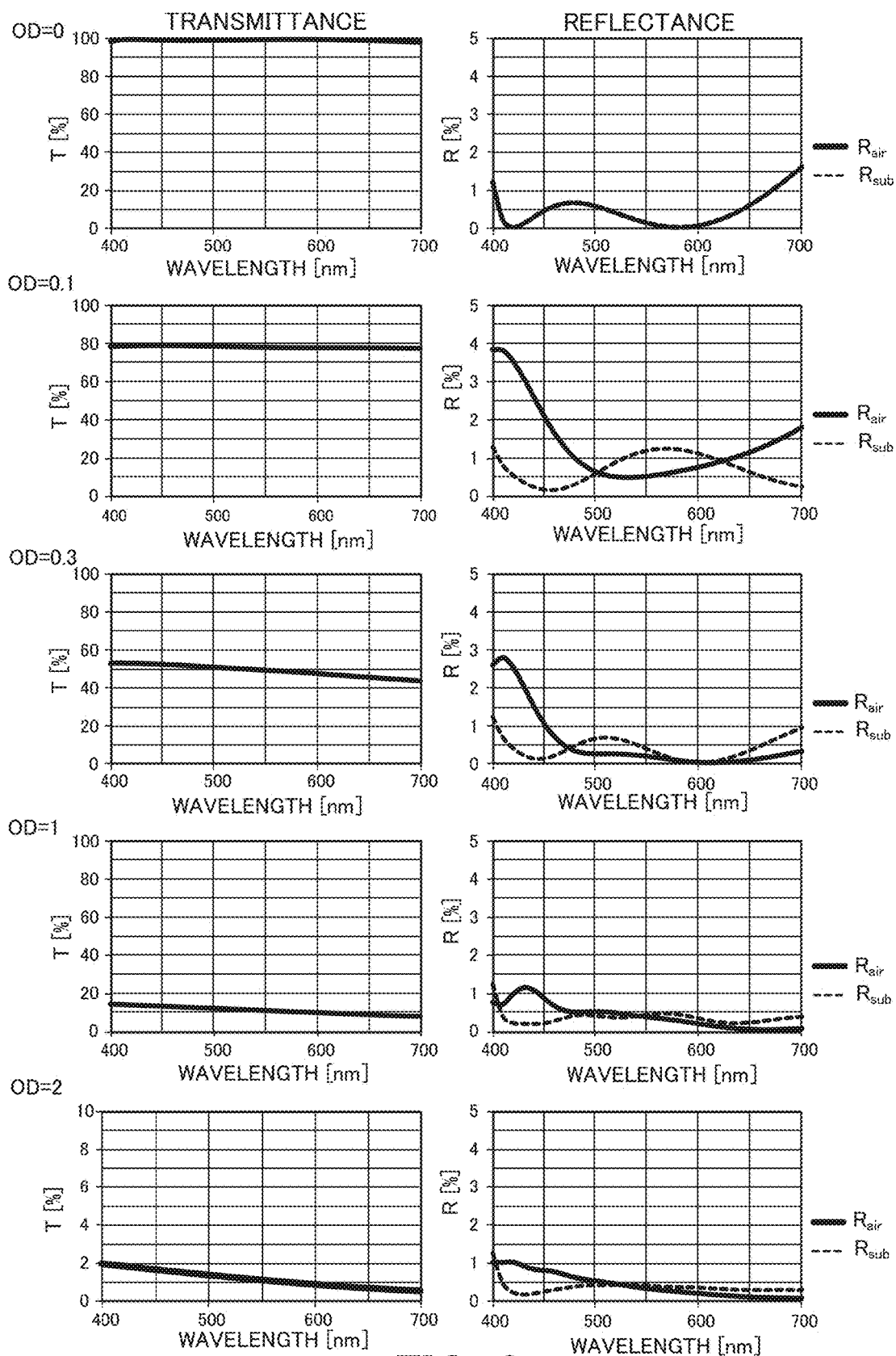
FIG. 2 is a diagram of illustrating a spectral transmittance and a spectral reflectance of the optical filter in Embodiment 1.

FIG. 2 is a diagram of illustrating a spectral transmittance and a spectral reflectance when light is incident vertically on the optical filter 100 (normal incidence). Hereinafter, each of the spectral transmittance and the spectral reflectance described in the specification is a characteristic of the normal incidence. FIG. 2 illustrates each of the spectral transmittance and the spectral reflectance relating to a region where an optical density OD relating to light having a wavelength of 550 nm is 0, 0.1, 0.3, 1, or 2. In FIG. 2, vertical axes indicate the spectral transmittance (transmittance T (%)) or the spectral reflectance (reflectance R (%)), and horizontal axes indicate a wavelength (nm). The optical density OD is a value which is defined as conditional expression (1) below by using the transmittance T ($0 \leq T \leq 1$).

[Math. 1]

$$OD = LOG_{10}(1/T) \qquad (1)$$

The region where the optical density OD is equal to 0 (OD=0) is a region where the thickness of the absorption layer 3 is 0, and a reflectance $R_{air}$ of light which is incident from the air side (surface side) and a reflectance $R_{sub}$ of light which is incident from the substrate side are equal to each other. On the other hand, in the region where the optical density OD is not equal to 0 (OD=0.1, 0.3, 1, or 2), i.e., the region where the thickness of the absorption layer 3 is not 0, the reflectance $R_{air}$ of the light which is incident from the air side and the reflectance $R_{sub}$ of the light which is incident from the substrate side are different from each other. This is because the Fresnel coefficient on each interface varies depending on an incidence direction when the absorption layer 3 exists.

As illustrated in FIG. 2, the optical filter 100 of this embodiment achieves a low reflectance independently of the optical density OD and the incident direction of light. Hereinafter, the reason above will be described referring to admittance trajectory diagrams. The admittance means a value represented by a ratio of a magnetic field strength and an electric field strength in a medium, and a refractive index of the medium is numerically equivalent to the admittance when an admittance $Y_0$ in a free space (admittance of vacuum) is a unit. Hereinafter, in the specification, the refractive index is regarded as equivalent to the admittance. The admittance trajectory diagram means a diagram of representing a film characteristic using a concept of an equivalent admittance. The equivalent admittance is an admittance of an equivalent substrate when an entire system of a substrate and a film provided on the substrate is replaced with a single substrate having a characteristic equivalent to the entire system. Details of the equivalent admittance and the admittance trajectory diagram are described in the literature "Cheng-Chung Lee, translated by ULVAC, Inc., OPTICAL THIN FILM AND FILM DEPOSITION TECHNOLOGY".

Figure 3C:
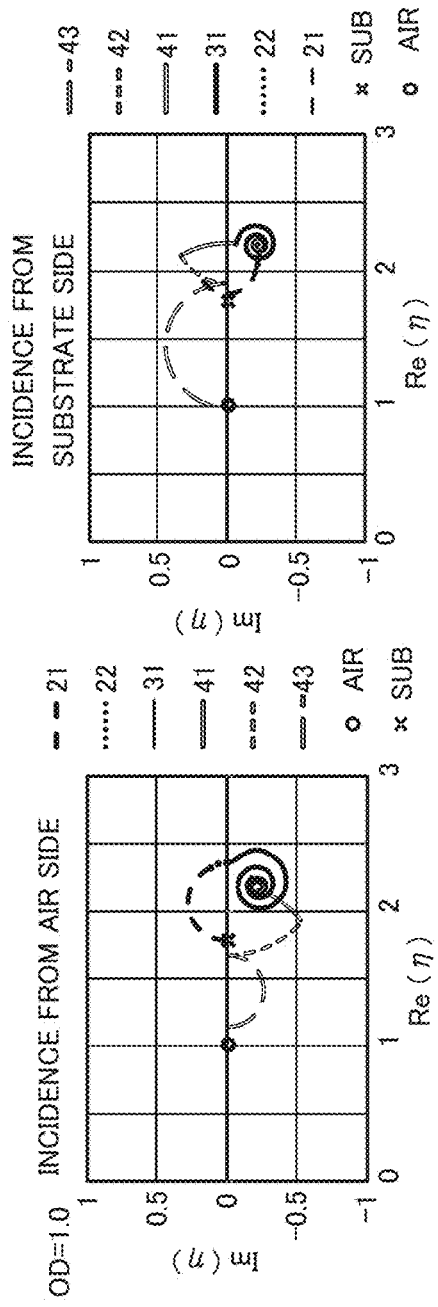
FIG. 3C is an admittance trajectory diagram of the optical filter in Embodiment 1.

FIGS. 3A to 3C are admittance trajectory diagrams of the optical filter 100 in this embodiment. FIGS. 3A to 3C illustrate equivalent admittances for incidence from the air side and for incidence from the substrate side when the optical density OD is equal to 0, 0.1, and 1, respectively. First, as an example, referring to FIG. 3A that illustrates the admittance trajectory diagram for the incidence from the air side, the drawing will be described. In FIG. 3A, a horizontal axis and a vertical axis indicate a real part $Re(\eta)$ of the admittance $\eta$ and an imaginary part $Im(\eta)$ of the admittance $\eta$, respectively, and symbol "x" and symbol "o" in the drawing represent an admittance of the substrate 1 and an admittance of the air, respectively. In this embodiment, since a transparent medium is used as the substrate 1, light is not absorbed by the substrate 1. The admittance $\eta_{sub}$ of the substrate 1 is equal to $N_{sub}Y_0$ ($\eta_{sub}=N_{sub}Y_0$) where $N_{sub}$ is a refractive index of the substrate 1. However, since the admittance $Y_0$ in the free space is a unit for the admittance of this embodiment, the admittance $\eta_{sub}$ and the refractive index $N_{sub}$ are numerically equal to each other ($\eta_{sub}=N_{sub}$). On the other hand, if the light is absorbed, the complex refractive index is N-ik and the admittance in this case is (N-ik)$Y_0$. Symbol k is an extinction coefficient. Also in this case, the admittance $Y_0$ in the free space is a unit for the admittance, the admittance and the complex refractive index are numerically equal to each other.

The optical filter 100 of FIGS. 3A to 3C includes, in order from the substrate 1, the intermediate antireflection layer 2, the absorption layer 3, and the surface antireflection layer 4. In this embodiment, the intermediate antireflection layer 2 includes films 21 and 22. The absorption layer 3 includes a film 31. The surface antireflection layer 4 includes films 41, 42, and 43. The intermediate antireflection layer 2 has a function of reducing reflection on an interface between the substrate 1 and the absorption layer 3. The surface antireflection layer 4 has a function of reducing reflection on an interface between the absorption layer 3 and the air.

The trajectory depicted on the left side of FIG. 3A illustrates a change of the equivalent admittance when the films 21, 22, 31, 41, 42, and 43 are formed on the substrate 1 in this order. A terminal point of the trajectory when the film 43 (termination layer) is formed represents a final equivalent admittance, and the Fresnel coefficient and the reflectance can be calculated according to the equivalent admittance and the admittance of the air (=1). When the equivalent admittance is equal to the admittance of the air, the reflectance is equal to 0. When the light is incident from the substrate side, the equivalent admittance where the films 43, 42, 41, 31, 22, and 21 are formed in order from the air may be obtained, and in this situation the reflectance is equal to 0 if the equivalent admittance is equal to the admittance of the substrate.

While FIG. 3A illustrates a case where the thickness of the absorption layer 3 (film 31) is 0 (and accordingly the equivalent admittance is not changed by the absorption layer 3), the admittance trajectory changes as illustrated in FIGS. 3B and 3C with increasing the thickness of the absorption layer 3 (film 31). If the absorption layer 3 is sufficiently thick, the equivalent admittance from the substrate 1 to the absorption layer 3 is approximately equal to a complex refractive index of the absorption layer 3 when the light is incident from the air side as illustrated in FIG. 3C. Similarly, the equivalent admittance from the air to the absorption layer 3 is approximately equal to the complex refractive index of the absorption layer 3 when the light is incident from the substrate side.

Accordingly, in the gradation ND filter (optical filter 100), when the light is incident from the air side, the equivalent admittance from the substrate 1 to the absorption layer 3 changes within a range of FIGS. 3A to 3C. The same is true in the case where the light is incident from the substrate side, and the equivalent admittance from the air to the absorption layer 3 also changes within the range of FIGS. 3A to 3C.

In this embodiment, in order to reduce the change of the equivalent admittance caused by the difference of the optical density OD, an extinction coefficient k of the absorption layer 3 satisfies conditional expression (2) below.

$$0 < k \leq 0.5 \qquad (2)$$

As a result, for example when the light is incident from the air side, a low reflectance can be achieved regardless of the optical density (thickness of the absorption layer 3) in a simple configuration where the surface antireflection layer 4 having a uniform (constant) thickness is provided on the upper side of the absorption layer 3 (film 31). Similarly, when the light is incident from the substrate side, a low reflectance can be achieved regardless of the optical density in a simple configuration where the intermediate antireflection layer 2 having a uniform thickness is provided on the lower side of the absorption layer 3. Accordingly, a superior antireflection performance that does not depend on an incident direction of the light can be obtained in the simple configuration like the optical filter 100 of this embodiment.

Figure 4A:
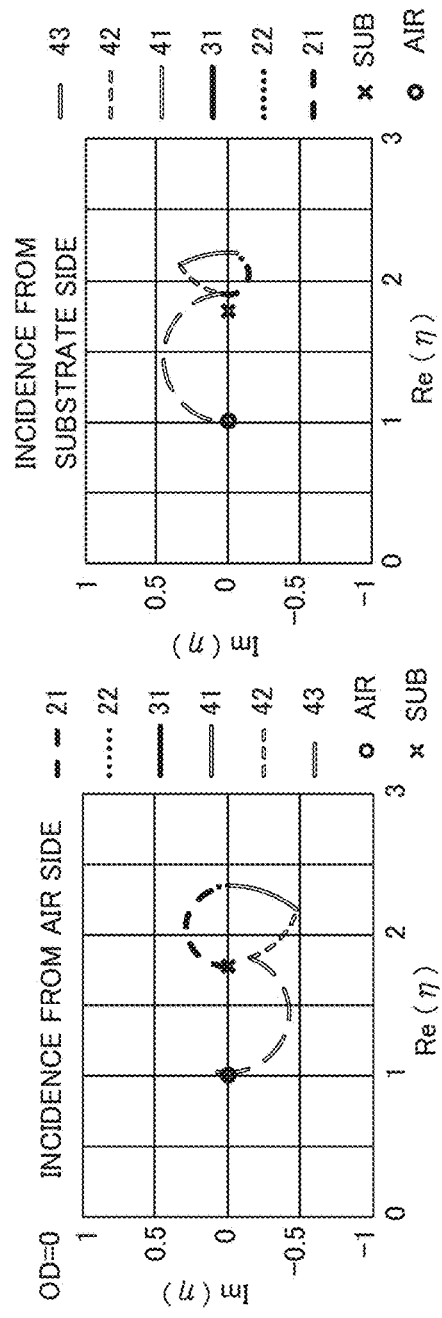
FIG. 4A is an admittance trajectory diagram of the optical filter when an extinction coefficient is 0.5.
Figure 4B:
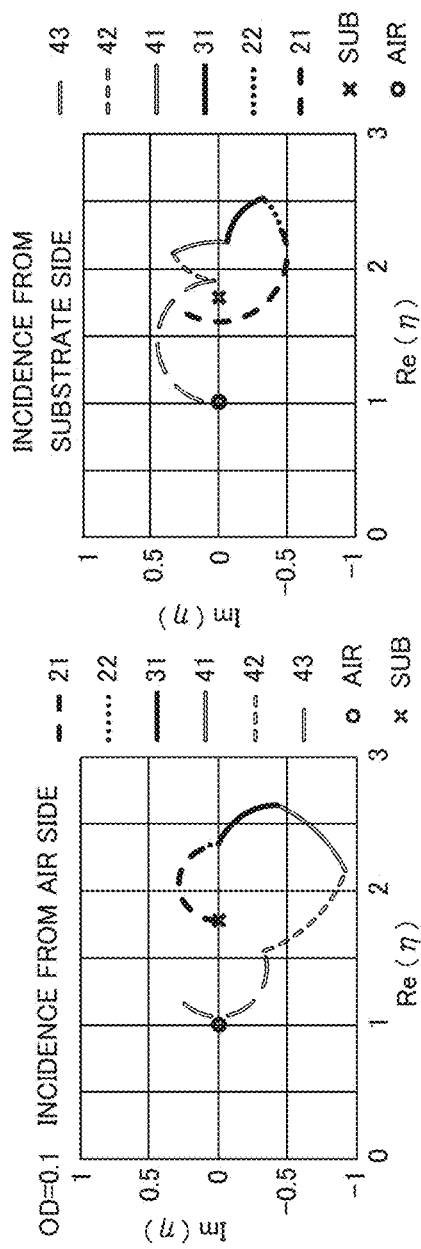
FIG. 4B is an admittance trajectory diagram of the optical filter when an extinction coefficient is 0.5.
Figure 4C:
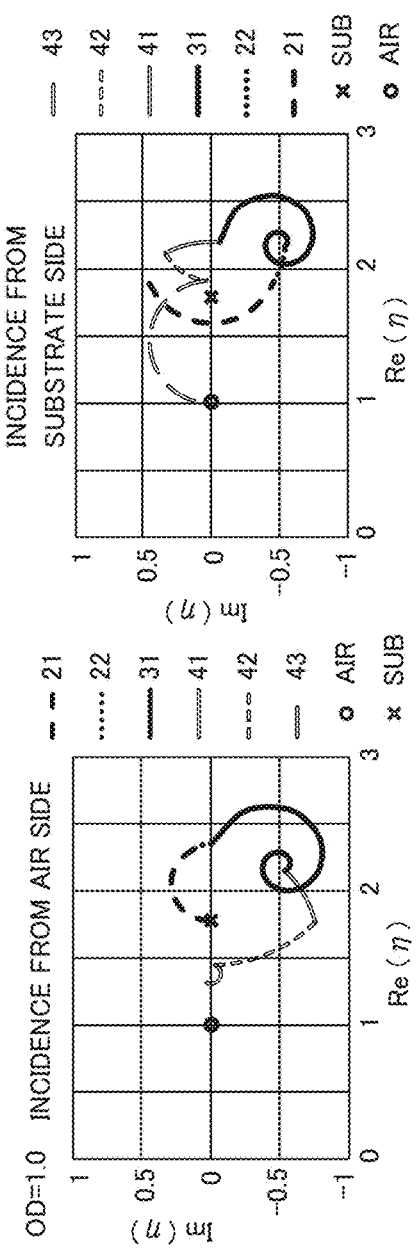
FIG. 4C is an admittance trajectory diagram of the optical filter when an extinction coefficient is 0.5.

FIGS. 4A to 4C are admittance trajectory diagrams of the optical filter 100 when a material of the extinction coefficient k=0.5 is used as the absorption layer 3 (film 31). In this case, when the absorption layer 3 is sufficiently thick (FIG. 4C), the equivalent admittance from the substrate 1 to the absorption layer 3 is approximately equal to the complex refractive index of the absorption layer 3. Compared to a case (FIG.

4A) where the thickness of the absorption layer 3 is 0, the equivalent admittance changes by a value corresponding to the extinction coefficient k=0.5. In this case, the change of the equivalent admittance from the substrate 1 to the absorption layer 3 caused by the change of the thickness of the absorption layer 3 increases compared to the case illustrated in FIGS. 3A to 3C. The change of the equivalent admittance from the substrate 1 to the absorption layer 3 caused by the change of the thickness of the absorption layer 3 increases with increasing the extinction coefficient k of the absorption layer 3. In other words, if the extinction coefficient k is larger than 0.5, the change of the equivalent admittance from the substrate 1 to the absorption layer 3 caused by the change of the thickness of the absorption layer 3 increases compared to the case illustrated in FIGS. 4A to 4C.

Figure 5:
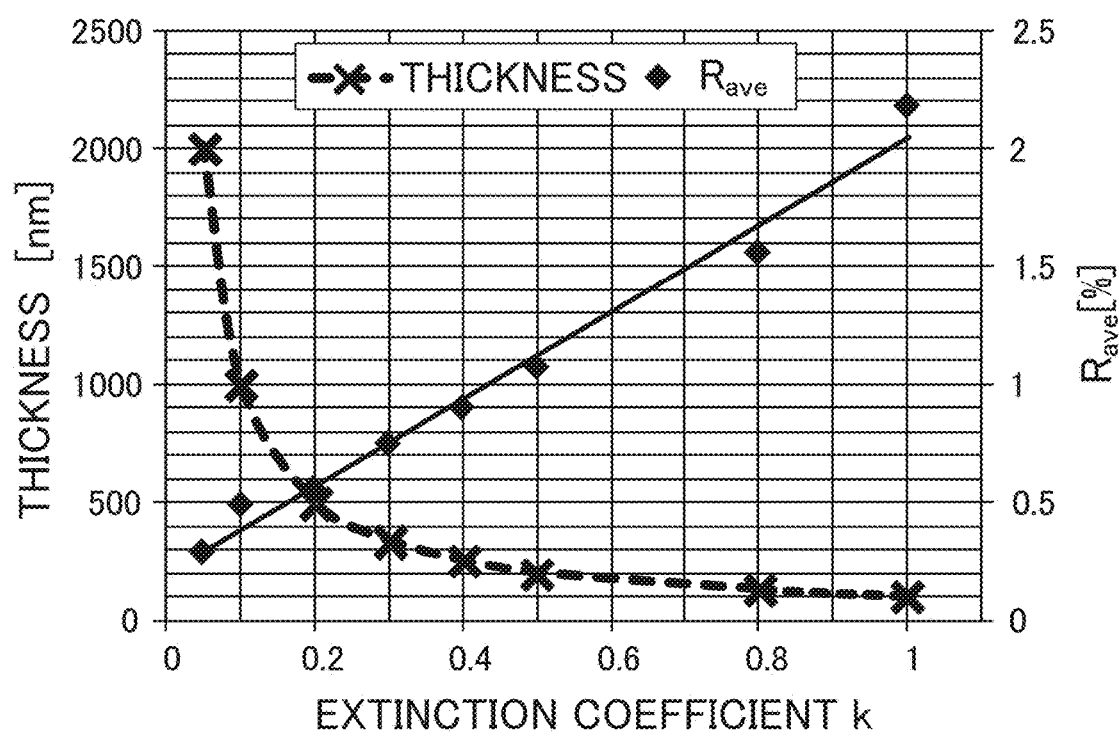
FIG. 5 is a diagram of a relationship between an extinction coefficient of an absorption layer and a thickness of the absorption layer and a relationship between an extinction coefficient of an absorption layer and an average reflectance in Embodiment 1.

FIG. 5 is a diagram of a relationship between the extinction coefficient k of the absorption layer 3 and the thickness of the absorption layer 3 and a relationships between the extinction coefficient k of the absorption layer 3 and an average reflectance $R_{ave}$ when the optical density OD is equal to 1 (OD=1). The average reflectance $R_{ave}$ is an average of a reflectance for the incidence from the air side and a reflectance for the incidence from the substrate side within a range of a wavelength from 400 nm to 700 nm. As illustrated in FIG. 5, the average reflectance $R_{ave}$ decreases with decreasing the extinction coefficient k. Accordingly, the reflectance can be reduced by satisfying conditional expression (2). On the other hand, the thickness of the absorption layer 3 increases with decreasing the extinction coefficient k. When the thickness of the absorption layer 3 increases, the optical path difference OPD illustrated in FIG. 1C increases. Accordingly, in view of both of the reduction of the reflectance R and the reduction of the optical path difference OPD, it is preferred that the range of the extinction coefficient k satisfies a range of conditional expression (2a) below.

$$0.05 \leq k \leq 0.35 \quad (2a)$$

In order to achieve both of the reduction of the reflectance and the reduction of the optical path difference, it is more preferable that the extinction coefficient k satisfies conditional expression (3) below.

$$0.15 \leq k \leq 0.25 \quad (3)$$

In order to reduce the change of the equivalent admittance from the substrate 1 to the absorption layer 3 and the change of the equivalent admittance from the air to the absorption layer 3 which are caused by the change of the thickness of the absorption layer 3, it is preferred that conditional expressions (4) and (5) are satisfied for the light having the wavelength of 550 nm.

$$|Re(\eta_{air})/Y_0 - N_{abs}| < 0.25 \quad (4)$$

$$|Re(\eta_{sub})/Y_0 - N_{abs}| < 0.25 \quad (5)$$

In conditional expressions (4) and (5), $\eta_{air}$ is an equivalent admittance from the substrate 1 to the intermediate antireflection layer 2 when the light is incident from the air side, and $\eta_{sub}$ is an equivalent admittance from the air to the surface antireflection layer 4 when the light is incident from the substrate side. In conditional expressions (4) and (5), $Y_0$ is an admittance of a free space, and $N_{abs}$ is a refractive index of the absorption layer 3.

As described above, by setting the real parts (corresponding to the refractive indices) of the equivalent admittances $\eta_{air}$ and $\eta_{sub}$ to be close to the refractive index $N_{abs}$, the equivalent admittance from the substrate 1 to the absorption layer 3 caused by the change of the thickness of the absorption layer 3 and the change of the equivalent admittance from the air to the absorption layer 3 can be reduced. For example, when the left side of conditional expression (4) is 0, a difference of the equivalent admittances from the substrate 1 to the absorption layer 3 between a region where the thickness of the absorption layer 3 is 0 and a region where the absorption layer 3 is sufficiently thick is approximately equal to an amount corresponding to the extinction coefficients k. If conditional expression (4) is not satisfied, terms of mismatch of the refractive index increase in addition to that, and accordingly the difference of the change of the equivalent admittance caused by the change of the thickness of the absorption layer 3 further increases. In other words, the reflection increases. The same is true in a case where light is incident from the substrate side. In order to further reduce the reflectance, it is preferred that values on the left sides of conditional expressions (4) and (5) satisfy conditional expressions (6) and (7), respectively.

$$|Re(\eta_{air})/Y_0 - N_{abs}| < 0.15 \quad (6)$$

$$|Re(\eta_{sub})/Y_0 - N_{abs}| < 0.15 \quad (7)$$

In order satisfy conditional expressions (4) and (6), it is preferred that a film material where a refractive index $N_m$ of at least one layer of the films constituting the intermediate antireflection layer 2 satisfies conditional expressions (8) and (9) below for the light having the wavelength of 550 nm is used.

$$N_{sub} < N_m < N_{abs} (N_{abs} > N_{sub}) \quad (8)$$

$$N_{sub} > N_m > N_{abs} (N_{abs} < N_{sub}) \quad (9)$$

In conditional expressions (8) and (9), $N_{sub}$ is a refractive index of the substrate 1.

In order to satisfy conditional expressions (5) and (7), it is preferred that a film material where a refractive index $N_t$ of at least one layer of the films constituting the surface antireflection layer 4 satisfies conditional expression (10) below for the light having the wavelength of 550 nm is used.

$$1 < N_t < N_{abs} \quad (10)$$

By forming the film materials which satisfy conditional expressions (8), (9), and (10), conditional expressions (4) and (5) can be satisfied.

Figure 6A:
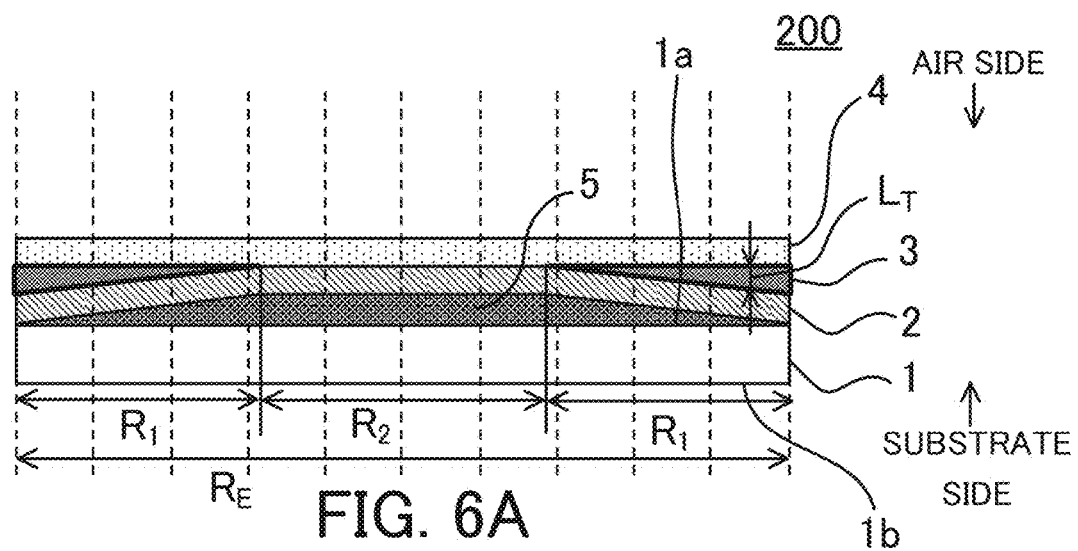
FIG. 6A is a schematic diagram (cross-sectional view) of an optical filter in Embodiment 2.
Figure 6B:
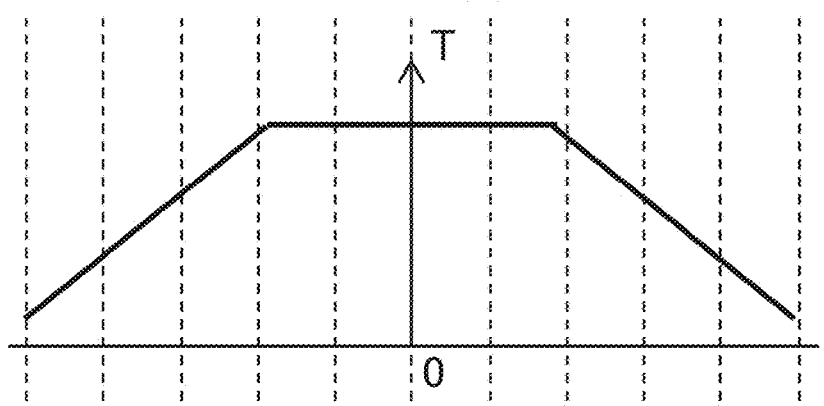
FIG. 6B is a diagram of illustrating a transmittance distribution in each region of the optical filter in Embodiment 2.
Figure 6C:
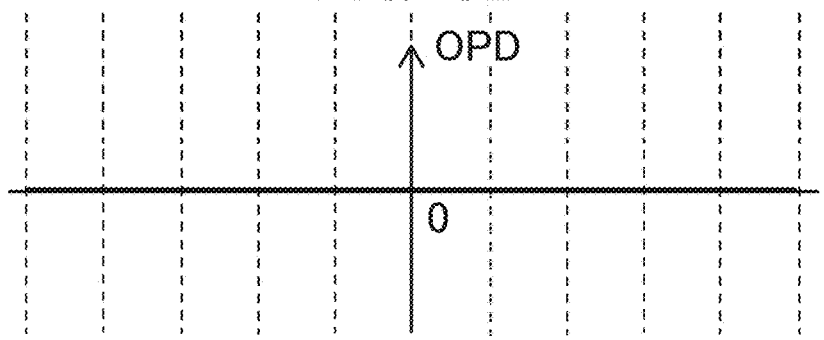
FIG. 6C is a diagram of illustrating a distribution of an optical path difference of the optical filter in Embodiment 2.

Next, referring to FIGS. 6A to 6C, a configuration of another optical filter in this embodiment will be described. FIG. 6A is a configuration diagram (cross-sectional view) of an optical filter 200 in this embodiment (Embodiment 2). FIGS. 6B and 6C illustrate a transmittance distribution and a distribution of an optical path difference of the optical filter 200, respectively. The optical filter 200 includes a substrate 1, a phase compensation layer 5, an intermediate antireflection layer 2, an absorption layer 3, and a surface antireflection layer 4. In other words, in the optical filter 200, the phase compensation layer 5 (phase compensation layer adjacent to the substrate 1), the intermediate antireflection layer 2, the absorption layer 3, and the surface antireflection layer 4 are formed in this order on a surface 1a (first surface) of the substrate 1. The optical filter 200 is different from the optical filter 100 in that the optical filter 200 includes the phase compensation layer 5.

Since the optical filter 200 changes a thickness of the absorption layer 3 to achieve a gradation ND filter, in principle, an optical path difference occurs. Accordingly, the optical filter 200 is configured to compensate the optical path difference. Since the phase compensation layer 5 compensates the optical path difference of the absorption layer 3, the thickness of the phase compensation layer 5 increases in an opposite direction to an increasing direction of the thickness of the absorption layer 3. In other words, the phase compensation layer 5 decreases in thickness with increasing the thickness of the absorption layer 3. As a result, the optical path difference caused by the change of the thickness of the absorption layer 3 can be compensated.

Since complex refractive indices of the absorption layer 3 and the phase compensation layer 5 are different from each other, it is difficult to match the admittance of the phase compensation layer 5 with the admittance of the absorption layer 3 independently of the thickness of the absorption layer 3. Accordingly, a reflectance changes due to the change of the thickness of the phase compensation layer 5 as well.

If the phase compensation layer 5 is disposed closer to the substrate 1 than the absorption layer 3 is, the change of the reflectance caused by the changes of the thicknesses of the phase compensation layer 5 and the absorption layer 3 tends to increase in a case where light is incident from the substrate side compared to a case where the light is incident from the air side. On the other hand, if the absorption layer 3 is disposed closer to the substrate 1 than the phase compensation layer 5 is, the change of the reflectance caused by the changes of the thicknesses of the phase compensation layer 5 and the absorption layer 3 tends to increase in a case where the light is incident from the air side compared to a case where the light is incident from the substrate side.

As described above, the tendency of the change of the reflectance caused by the thicknesses of the absorption layer 3 and the phase compensation layer 5 varies depending on a position of the phase compensation layer 5 and an incident direction of the light. Typically, it is easy to reduce the reflectance for the incidence from the substrate side compared to the reflectance for the incidence from the air side. Accordingly, in order to reduce the reflectance for the incidence of the light from the air side and the reflectance for the incidence of the light from the substrate side in a balanced manner, it is preferred that the phase compensation layer 5 is disposed between the substrate 1 and the absorption layer 3.

Additionally, if the phase compensation layer 5 is disposed at a position adjacent to the substrate 1 like the optical filter 200 illustrated in FIGS. 6A to 6C, it is preferred that a refractive index $N_{sub}$ of the substrate 1 and a refractive index $N_c$ of the phase compensation layer 5 satisfy conditional expression (11) below for light having a wavelength of 550 nm.

$$|N_c - N_{sub}| \leq 0.1 \quad (11)$$

By using a material of the phase compensation layer 5 satisfying conditional expression (11), a reflection on an interface between the substrate 1 and the phase compensation layer 5 can be substantially ignored. Accordingly, the optical path difference OPD can be compensated without using an extra antireflection film between the substrate 1 and the phase compensation layer 5.

In the optical filter 200, it is preferred that the thickness of the phase compensation layer 5 is changed so that the optical path difference OPD of the optical filter 200 between a position where the thickness of the absorption layer 3 is minimum and a position where the thickness of the absorption layer 3 is maximum satisfies conditional expression (12) below for the light having the wavelength of 550 nm.

$$|OPD/\lambda| \leq 0.3 \quad (12)$$

In conditional expression (12), $\lambda$ is a wavelength of light. By satisfying conditional expression (12), as illustrated in FIGS. 6B and 6C, the optical path difference OPD can be reduced to a sufficiently small value while the optical filter 200 changes in transmittance occurring due to the change of the thickness of the absorption layer 3.

Figure 11A:
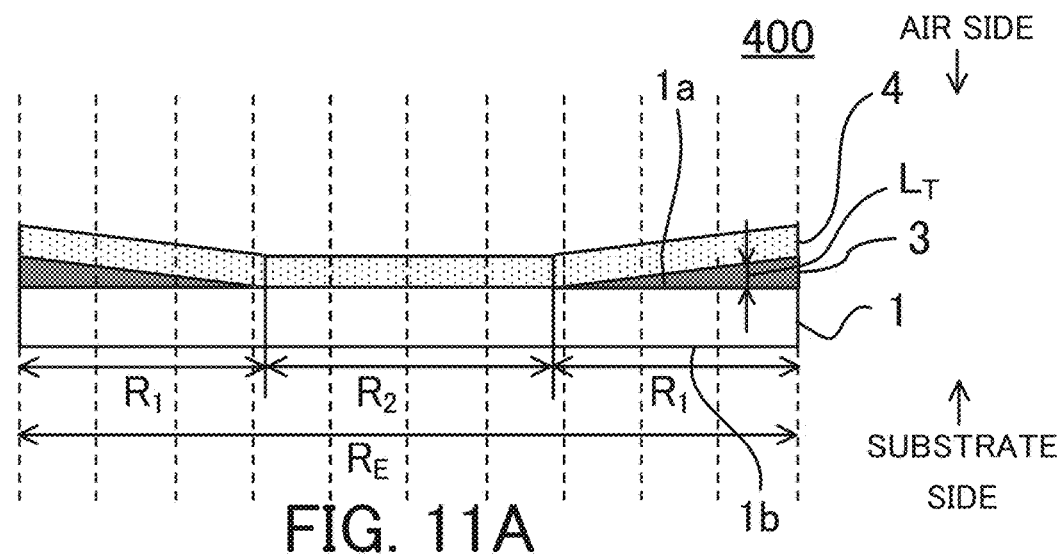
FIG. 11A is a schematic diagram (cross-sectional view) of an optical filter in Embodiment 4.
Figure 11B:
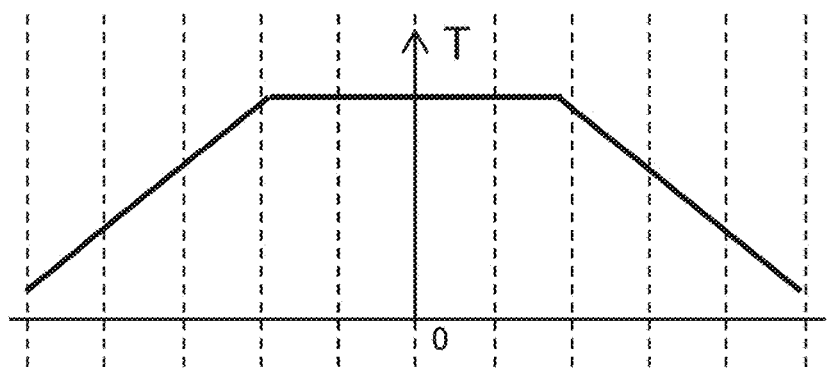
FIG. 11B is a diagram of illustrating a transmittance distribution in each region of the optical filter in Embodiment 4.
Figure 11C:
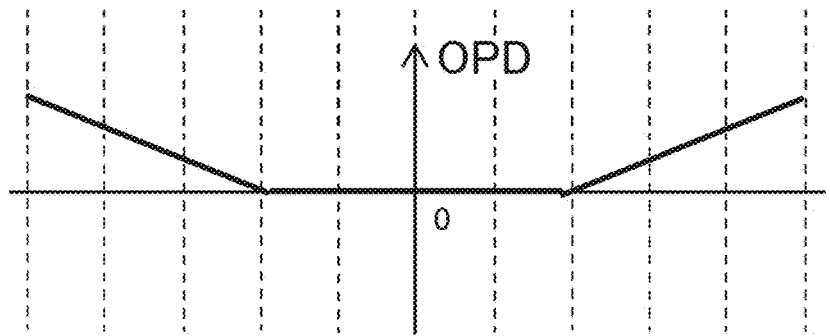
FIG. 11C is a diagram of illustrating a distribution of an optical path difference of the optical filter in Embodiment 4.

Next, referring to FIGS. 11A to 11C, a configuration of another optical filter in this embodiment will be described. FIG. 11A is a configuration diagram (cross-sectional view) of an optical filter 400 in this embodiment (Embodiment 4). FIGS. 11B and 11C illustrate a transmittance distribution and a distribution of an optical path difference of the optical filter 400, respectively. The optical filter 400 includes a substrate 1, an absorption layer 3, and a surface antireflection layer 4. In other words, in the optical filter 400, the absorption layer 3 and the surface antireflection layer 4 are formed in this order on a surface 1a (first surface) of the substrate 1. The optical filter 400 is different from the optical filter 100 in that the optical filter 400 does not include the intermediate antireflection layer 2.

Each of the optical filters 100 and 200 includes the intermediate antireflection layer 2 in order to reduce the interface reflection caused by admittance mismatch between the substrate 1 and the absorption layer 3. On the other hand, in the optical filter 400, in order to reduce the interface reflection caused by the admittance mismatch between the substrate 1 and the absorption layer 3, a refractive index $N_{sub}$ of the substrate 1 and a refractive index N of the absorption layer $N_{abs}$ satisfy conditional expression (13) below for the light having the wavelength of 550 nm.

$$|N_{sub} - N_{abs}| \leq 0.2 \quad (13)$$

Since the mismatch of the refractive indices (corresponding to a real part of the admittances) of the substrate 1 and the absorption layer 3 is reduced by satisfying conditional expression (13), the interface reflection between the substrate 1 and the absorption layer 3 can be reduced. In this configuration, a gradation ND filter which has a high antireflection performance with a small number of laminated layers can be achieved. The absorption layer 3 and the surface antireflection layer 4 have roles similar to those of each of the optical filters 100 and 200. Accordingly, it is preferred that the absorption layer 3 and the surface antireflection layer 4 of the optical filter 400 satisfy each conditional expression described above.

In the optical filter of this embodiment, the substrate 1 may be manufactured by using a transparent material such as a glass and a plastic for a use wavelength. The substrate 1 may be a convex lens or a concave lens instead of a flat plate, and a shape of its surface may be a curved surface. By forming the optical filter of this embodiment directly on a lens curved surface of an optical system, it is not necessary to provide a space to dispose the optical filter, and as a result for example a small-sized image pickup apparatus can be achieved.

The absorption layer 3 having a thickness distribution can be formed by vapor deposition or sputtering. By using a mask having an arbitrary shape in the vapor deposition or the sputtering, the absorption layer 3 having an arbitrary transmittance distribution can be formed. Instead, wet process method such as plating and spin coat may be used.

The material of the absorption layer 3 needs only to satisfy the condition of the extinction coefficient k that is represented by conditional expression (2), and for example oxygen-deficient $TiO_2$, $Nb_2O_5$, or $Ta_2O_5$ is used. In order to obtain a wavelength flatness of the spectral transmittance of the ND filter, materials which have different wavelength dispersions of the extinction coefficient k between positive and negative values in a use wavelength band may be combined. FIG. 14 is a diagram of illustrating a wavelength characteristic (wavelength dispersion characteristic) of the extinction coefficient k of each of the oxygen-deficient $TiO_2$ and $Ta_2O_5$. In FIG. 14, a vertical axis and a horizontal axis indicate an extinction coefficient and a wavelength (nm), respectively. As can be seen in FIG. 14, the extinction coefficient k satisfies conditional expression (2).

Figure 17:
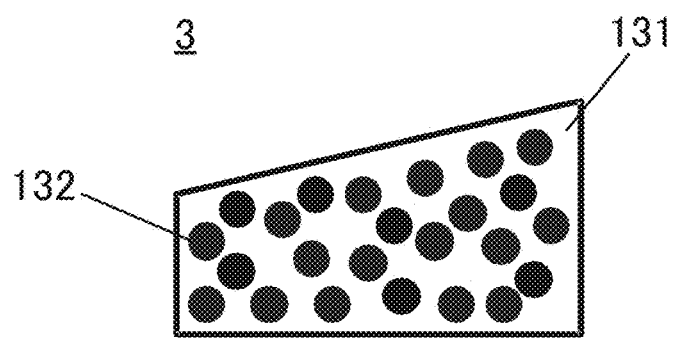
FIG. 17 is a schematic diagram of illustrating a case where an absorption layer is formed by resin in which fine particles formed by a material having a light-absorbing characteristic are dispersed.

The absorption layer 3 is not limited to a homogeneous film that is formed by the vapor deposition or the sputtering. As illustrated in FIG. 17, the absorption layer 3 can be formed by dispersing fine particles 132 formed by a light-absorbing material into a resin 131. FIG. 17 is an enlarged view of a part of the absorption layer 3.

In this case, the extinction coefficient of the absorption layer 3 can be obtained by calculating an absorption coefficient $\alpha(\lambda)$ based on an absorption amount and a thickness of the absorption layer 3 and then by using a relational expression of $\alpha(\lambda)=4\pi k(\lambda)/\lambda$ based on the absorption coefficient. The extinction coefficient obtained as described above needs only to satisfy conditional expression (2) described above.

As illustrated in FIGS. 15A to 15D, various shapes can be used as the transmittance distribution of the gradation ND filter (optical filter). FIGS. 15A to 15D are diagrams of illustrating the optical filter. For example, as illustrated in FIGS. 15A and 15B, the transmittance distribution can be formed in a concentric direction. Alternatively, as illustrated in FIGS. 15C and 15D, the optical filter may be configured so that the transmittance changes in a single direction. In addition, there are various transmittance distribution shapes for the intended use, and this embodiment can be applied to arbitrary transmittance distribution shapes.

As described above, the optical filter of this embodiment is an optical filter having a region where the transmittance T changes in a first direction, and includes the substrate 1, the absorption layer 3, and the surface antireflection layer 4 in this order along a second direction that is orthogonal to the first direction. The thickness $L_T$ of the absorption layer 3 in the second direction changes in the first direction. The extinction coefficient k of the absorption layer 3 satisfies conditional expression (2), preferably conditional expression (2a), and more preferably conditional expression (3) described above. Preferably, the region where the transmittance T changes is a region where the transmittance T continuously changes in the first direction, and the thickness $L_T$ of the absorption layer 3 continuously changes in the first direction. Preferably, the first direction is an in-plane direction of the substrate 1, the second direction is a direction orthogonal to the in-plane direction, and the extinction coefficient k is a value obtained when the light having the wavelength of 550 nm is incident on the optical filter.

Preferably, the thickness $L_T$ of the absorption layer 3 changes correspondingly to the region where the transmittance T changes. Preferably, the optical filter includes a first region (region $R_1$) where the transmittance T changes, and a second region (region $R_2$) where the transmittance T is constant. The absorption layer 3 is formed in the first region and is not formed in the second region. Preferably, the intermediate antireflection layer 2 is provided between the substrate 1 and the absorption layer 3.

Hereinafter, the optical filter of the present invention will be specifically described in each embodiment.

[Embodiment 1]

First, an optical filter 100 in Embodiment 1 will be described. As illustrated in FIG. 1B, the optical filter 100 of this embodiment is a gradation ND filter that gradually reduces a transmittance from a center toward a periphery in an optical surface (in an in-plane direction).

Table 1 indicates characteristics of each element constituting the optical filter 100.

TABLE 1

| Surf No. | n | d[nm] | k | REMARKS |
|---|---|---|---|---|
| air | 1 | — | 0 | AIR |
| 43 | 1.38163 | 97.9 | 0 | SURFACE ANTIREFLECTION |
| 42 | 2.26066 | 21.8 | 0 | LAYER 4 |
| 41 | 1.38163 | 12.7 | 0 | |
| 31 | 2.19147 | Variable | 0.2180 | ABSORPTION LAYER 3 |
| 22 | 2.11741 | 11.1 | 0 | INTERMEDIATE |
| 21 | 2.03842 | 59.1 | 0 | ANTIREFLECTION LAYER 2 |
| sub | 1.77582 | — | 0 | SUBSTRATE 1 |

In Table 1, symbols n and k are a refractive index and an extinction coefficient for light having a wavelength of 550 nm, respectively. Symbol d is a thickness of each of films 21, 22, 31, 41, 42, and 43. The same is true in Tables 2, 3, and 4 below.

The optical filter 100 includes an intermediate antireflection layer 2, an absorption layer 3, and a surface antireflection layer 4 in order from a substrate 1. The intermediate antireflection layer 2 is composed of two layers of the films 21 and 22. The surface antireflection layer 4 is composed of three layers of the films 41, 42, and 43. The absorption layer 3 is composed of a single layer of the film 31, and an oxygen-deficient $TiO_2$ is used as the absorption layer 3 in this embodiment. The extinction coefficient k of the oxygen-deficient $TiO_2$ for the light having the wavelength of 550 nm is 0.2180 as indicated in Table 1.

FIG. 2 is a diagram of illustrating a spectral transmittance and a spectral reflectance ($R_{air}$: reflectance for incidence from the air side, $R_{sub}$: reflectance for incidence from the substrate side) of the optical filter 100. FIG. 2 illustrates the spectral transmittance and the spectral reflectance at positions where the optical density OD is 0, 0.1, 0.3, 1, and 2, respectively, for the light having the wavelength of 550 nm. Since the extinction coefficient k of the absorption layer 3 (film 31) satisfies conditional expression (2), both of the reflectances $R_{air}$ and $R_{sub}$ are low regardless of the optical density OD.

FIGS. 3A to 3C illustrate admittance trajectory diagrams of the optical filter 100 for the light having the wavelength of 550 nm. FIGS. 3A to 3C are the admittance trajectory diagrams on conditions that the optical density OD is 0, 0.1, and 1, respectively. Since the extinction coefficient k of the absorption layer 3 satisfies conditional expression (2), the change of the equivalent admittance from the substrate 1 to the absorption layer 3 caused by the difference of the optical density OD (difference of the thickness of the absorption layer 3) and the change of the equivalent admittance from the air to the absorption layer 3 are small.

In addition, materials that satisfy conditional expression (8) are used as the films 21 and 22, and the thickness is adjusted so that the equivalent admittance from the substrate 1 to the intermediate antireflection layer 2 satisfies conditional expression (4). As a result, the difference of the change of the equivalent admittance from the substrate 1 to the absorption layer 3 caused by the optical density OD can be reduced. Similarly, materials that satisfy conditional expression (10) are used as the films 41 and 43, and the thickness is adjusted so that the equivalent admittance from the air to the surface antireflection layer 4 satisfies conditional expression (5). As a result, the difference of the change of the equivalent admittance from the air to the absorption layer 3 caused by the optical density OD can be reduced.

[Embodiment 2]

Next, an optical filter 200 in Embodiment 2 will be described. As illustrated in FIG. 6A, the optical filter 200 includes a phase compensation layer 5, an intermediate antireflection layer 2, an absorption layer 3, and a surface antireflection layer 4 in order from a substrate 1. The optical filter 200 is different from the optical filter 100 of Embodiment 1 in that the optical filter 200 includes the phase compensation layer 5.

Table 2 indicates characteristics of each element constituting the optical filter 200.

TABLE 2

| Surf No. | n | d[nm] | k | REMARKS |
|---|---|---|---|---|
| air | 1 | — | 0 | AIR |
| 43 | 1.38163 | 98.3 | 0 | SURFACE ANTIREFLECTION |
| 42 | 2.26066 | 24.2 | 0 | LAYER 4 |
| 41 | 1.38163 | 12.0 | 0 | |
| 31 | 2.33022 | Variable | 0.2880 | ABSORPTION LAYER 3 |
| 22 | 2.11741 | 24.3 | 0 | INTERMEDIATE |
| 21 | 2.03842 | 46.1 | 0 | ANTIREFLECTION LAYER 2 |
| sub | 1.77582 | — | 0 | SUBSTRATE 1 |

In this embodiment, the phase compensation layer 5 uses the same material as that of the substrate 1, and accordingly the phase compensation layer 5 does not provide any influences to reflection characteristics. Therefore, in Table 2, the phase compensation layer 5 is omitted. The number of laminated layers of films that constitute each antireflection layer is the same as that in Embodiment 1. In this embodiment, the absorption layer 3 uses oxygen-deficient $Ta_2O_5$, and the extinction coefficient k for the light having the wavelength of 550 nm is 0.2880 as indicated in Table 2.

Figure 7:
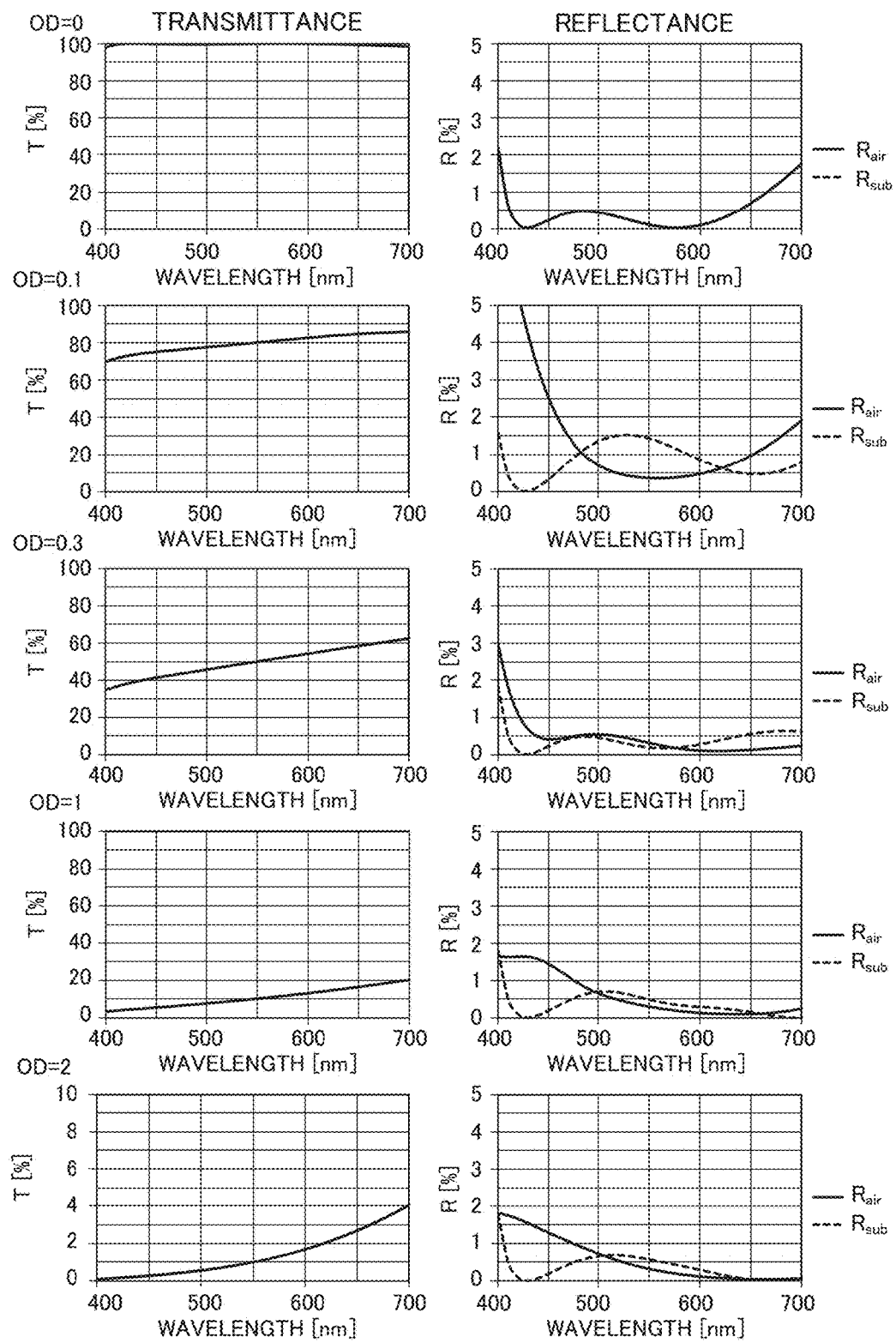
FIG. 7 is a diagram of illustrating a spectral transmittance and a spectral reflectance of the optical filter in Embodiment 2.
Figure 8:
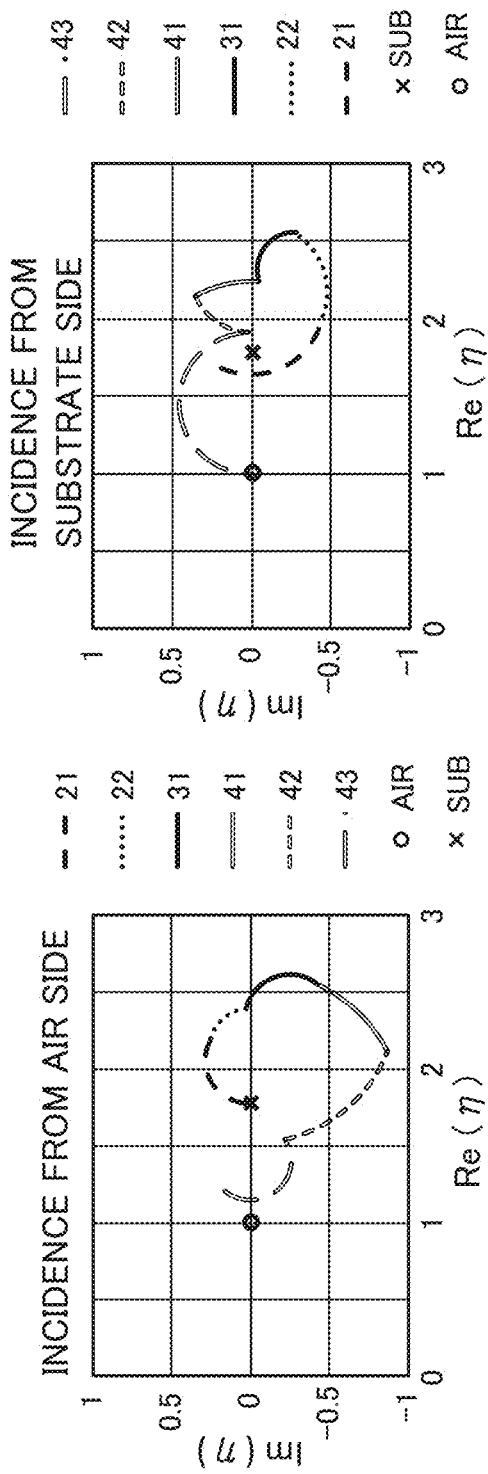
FIG. 8 is an admittance trajectory diagram of the optical filter in Embodiment 2.

FIG. 7 is a diagram of illustrating a spectral transmittance and a spectral reflectance ($R_{air}$: reflectance for incidence from the air side, $R_{sub}$: reflectance for incidence from the substrate side) of the optical filter 200. FIG. 7 illustrates the spectral transmittance and the spectral reflectance at positions where the optical density OD is 0, 0.1, 0.3, 1, and 2, respectively, for the light having the wavelength of 550 nm. FIG. 8 illustrates admittance trajectory diagrams of the optical filter 200 on conditions that the optical density OD is 0.1. Similarly to Embodiment 1, since conditional expressions (2), (4), (5), (8), and (10) are satisfied, both of the reflectances $R_{air}$ and $R_{sub}$ are low regardless of the optical density OD.

[Embodiment 3]

Next, an optical filter in Embodiment 3 will be described. Table 3 indicates characteristics of each element constituting the optical filter of this embodiment.

TABLE 3

| Surf No. | n | d[nm] | k | REMARKS |
|---|---|---|---|---|
| air | 1 | — | 0 | AIR |
| 42 | 1.38163 | 86.7 | 0 | SURFACE ANTIREFLECTION |
| 41 | 1.96915 | 38.1 | 0 | LAYER 4 |
| 31 | 2.19147 | Variable | 0.1090 | ABSORPTION LAYER 3 |
| 21 | 1.78910 | 68.7 | 0 | INTERMEDIATE ANTIREFLECTION LAYER 2 |
| sub | 1.51805 | — | 0 | SUBSTRATE 1 |

Similarly to the optical filter 100 of Embodiment 1, the optical filter of this embodiment includes an intermediate antireflection layer 2, an absorption layer 3, and a surface antireflection layer 4 in order from a substrate 1. However, in the optical filter of this embodiment, the intermediate antireflection layer 2 is composed of only a single layer of the film 21, and the surface antireflection layer 4 is composed of two layers of the films 41 and 42. Differently from each of Embodiments 1 and 2, the substrate 1 uses a transparent glass having a refractive index of 1.518, and the refractive index of the substrate 1 is not limited as long as the intermediate antireflection layer 2 is used. In this embodiment, the extinction coefficient k for the light having the wavelength of 550 nm is 0.1090 as indicated in Table 3.

Figure 9:
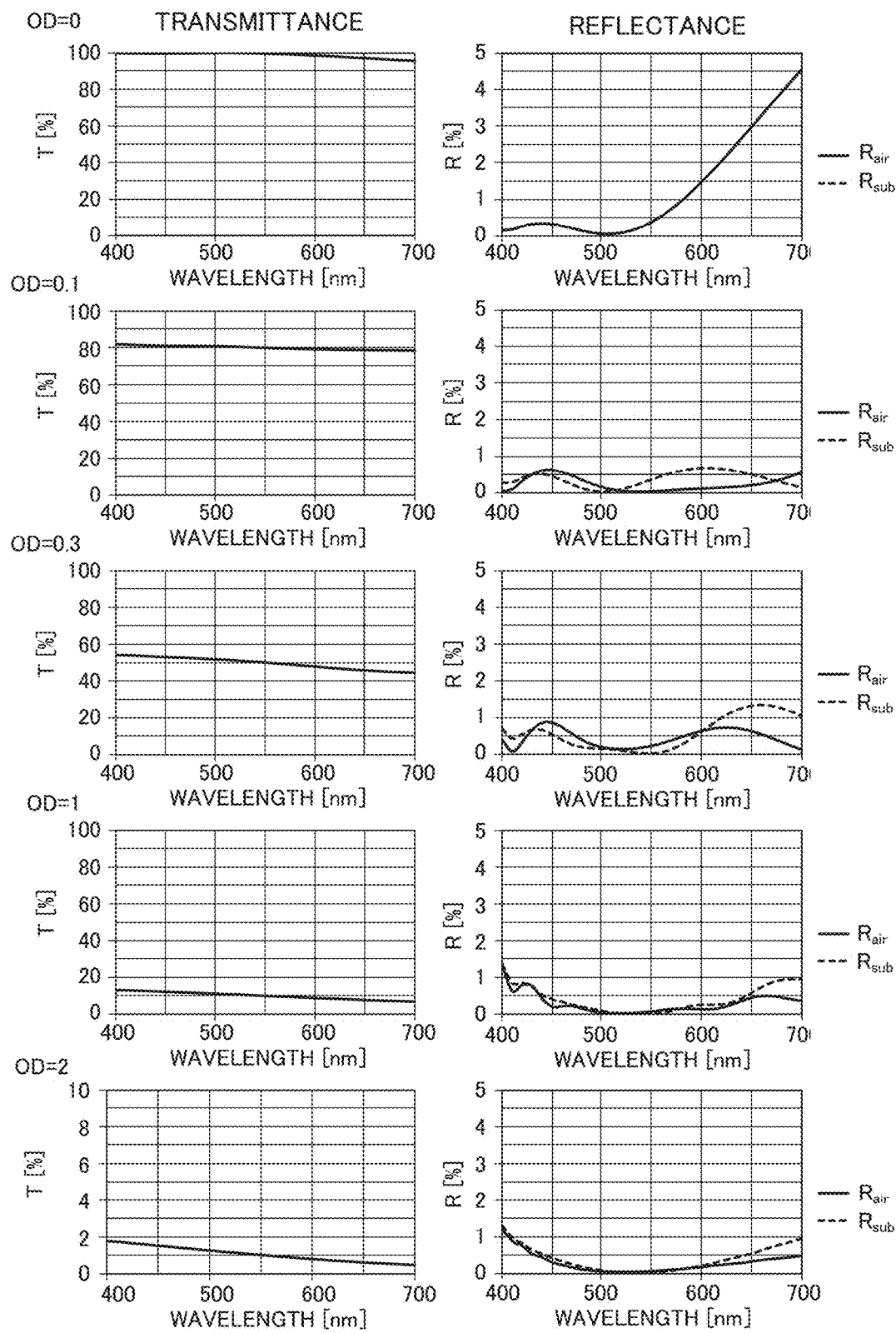
FIG. 9 is a diagram of illustrating a spectral transmittance and a spectral reflectance of an optical filter in Embodiment 3.
Figure 10:
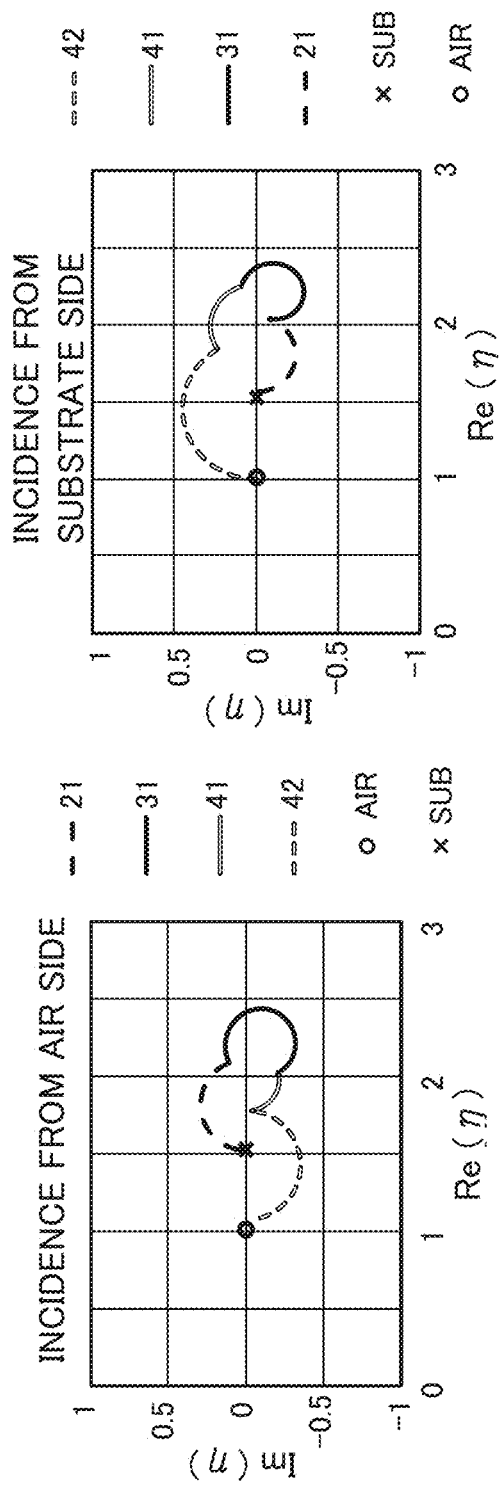
FIG. 10 is an admittance trajectory diagram of the optical filter in Embodiment 3.

FIG. 9 is a diagram of illustrating a spectral transmittance and a spectral reflectance ($R_{air}$: reflectance for incidence from the air side, $R_{sub}$: reflectance for incidence from the substrate side) of the optical filter in this embodiment. FIG. 9 illustrates the spectral transmittance and the spectral reflectance at positions where the optical density OD is 0, 0.1, 0.3, 1, and 2, respectively, for the light having the wavelength of 550 nm. FIG. 10 illustrates admittance trajectory diagrams of the optical filter in this embodiment on conditions that the optical density OD is 0.1. Similarly to each of Embodiments 1 and 2, since conditional expressions (2), (4), (5), (8), and (10) are satisfied, both of the reflectances $R_{air}$ and $R_{sub}$ are low regardless of the optical density OD.

[Embodiment 4]

Next, an optical filter 400 in Embodiment 4 will be described. As illustrated in FIG. 11A, the optical filter 400 includes an absorption layer 3 and a surface antireflection layer 4 in order from a substrate 1. The optical filter 400 is different from the optical filter of each of Embodiments 1 to 3 in that the optical filter 400 does not include the intermediate antireflection layer 2.

Table 4 indicates characteristics of each element constituting the optical filter 400.

TABLE 4

| Surf No. | n | d[nm] | k | REMARKS |
|---|---|---|---|---|
| air | 1 | — | 0 | AIR |
| 43 | 1.38299 | 93.6 | 0 | SURFACE ANTIREFLECTION |
| 42 | 2.10853 | 60.2 | 0 | LAYER 4 |
| 41 | 2.34224 | 12.6 | 0 | |
| 31 | 2.19140 | Variable | 0.1947 | ABSORPTION LAYER 3 |
| sub | 2.00330 | 0 | 0 | SUBSTRATE 1 |

In this embodiment, the refractive index of the substrate 1 is set to be close to the refractive index of the absorption layer 3, and accordingly the interface reflection between the substrate 1 and the absorption layer 3 is reduced. In this embodiment, the extinction coefficient k for the light having the wavelength of 550 nm is 0.1947 as indicated in Table 4.

Figure 12:
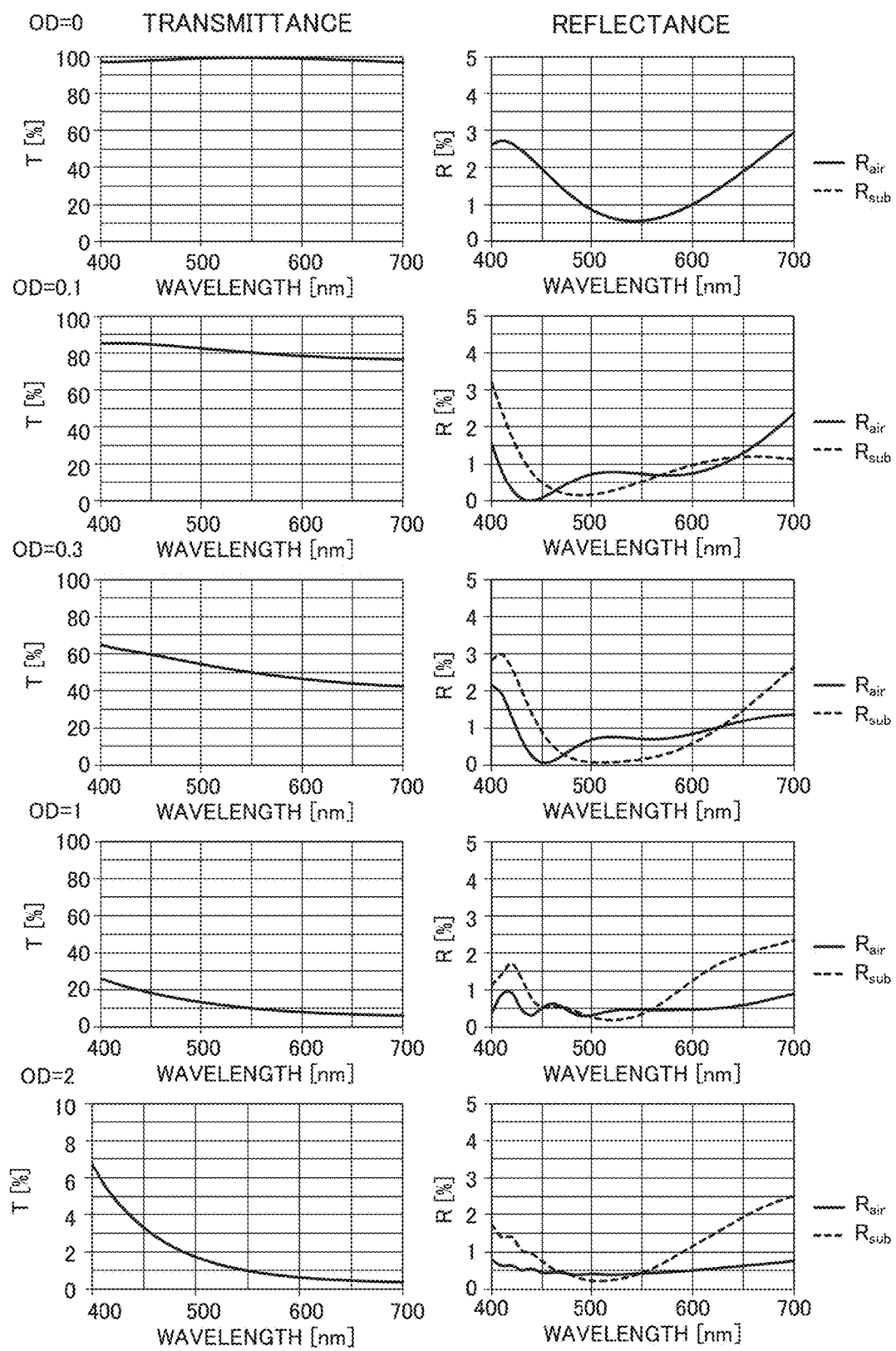
FIG. 12 is a diagram of illustrating a spectral transmittance and a spectral reflectance of the optical filter in Embodiment 4.
Figure 13:
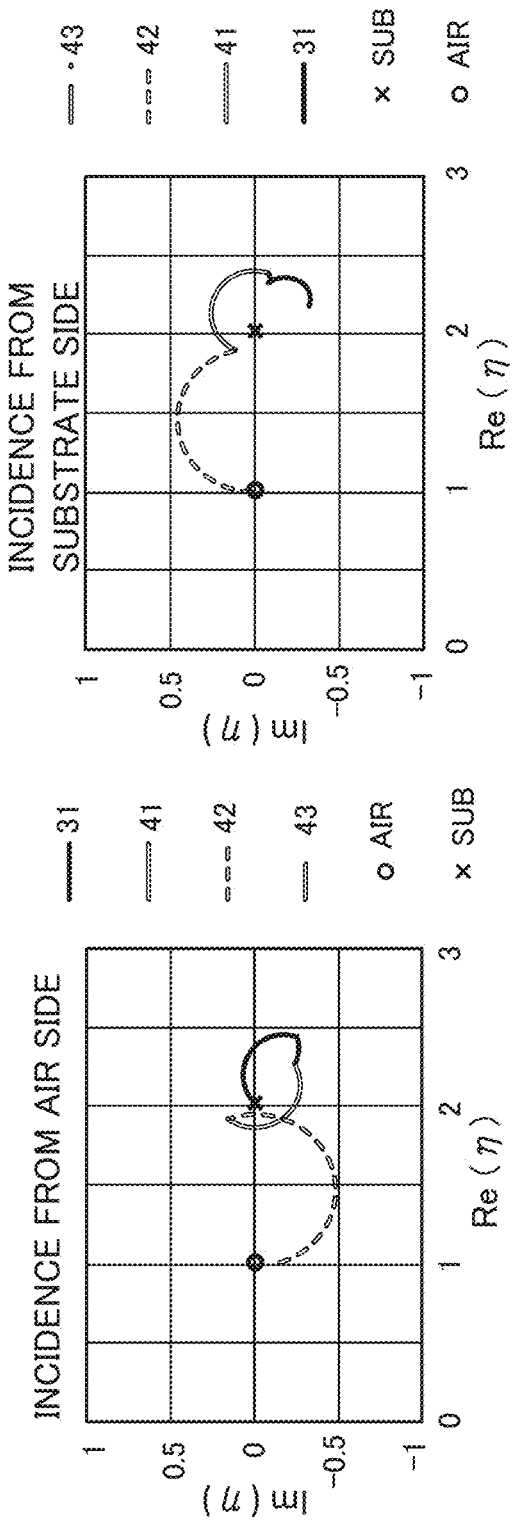
FIG. 13 is an admittance trajectory diagram of the optical filter in Embodiment 4.

FIG. 12 is a diagram of illustrating a spectral transmittance and a spectral reflectance ($R_{air}$: reflectance for incidence from the air side, $R_{sub}$: reflectance for incidence from the substrate side) of the optical filter 400. FIG. 12 illustrates the spectral transmittance and the spectral reflectance at positions where the optical density OD is 0, 0.1, 0.3, 1, and 2, respectively, for the light having the wavelength of 550 nm. FIG. 13 illustrates admittance trajectory diagrams of the optical filter in this embodiment on conditions that the optical density OD is 0.1. Since the optical filter 400 satisfies conditional expressions (2), (5), (10), and (13), both of the reflectances $R_{air}$ and $R_{sub}$ are low regardless of the optical density OD.

[Embodiment 5]

Figure 16:
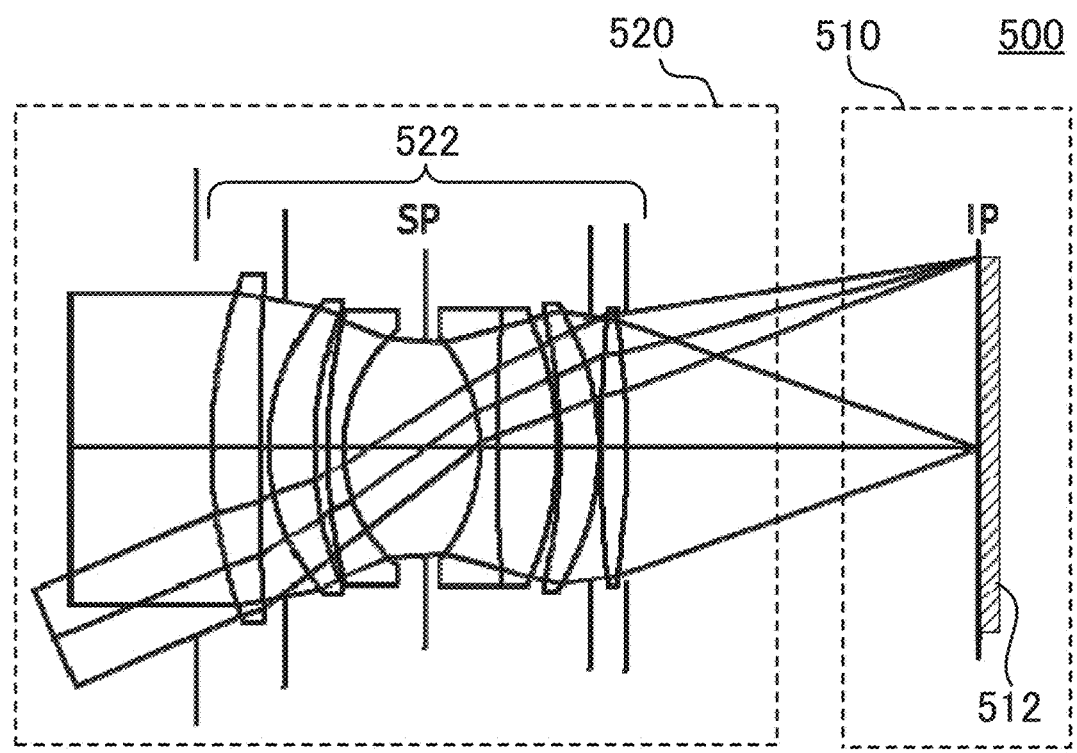
FIG. 16 is a cross-sectional view of an image pickup apparatus in Embodiment 5.

Next, referring to FIG. 16, an image pickup apparatus 500 in Embodiment 5 will be described. FIG. 16 is a cross-sectional view of the image pickup apparatus 500 in this embodiment. The image pickup apparatus 500 includes an image pickup apparatus body 510 and a lens apparatus 520 that is removably attached to the image pickup apparatus body 510. However, this embodiment is not limited thereto, and it can be applied also to an image pickup apparatus which includes the image pickup apparatus body and the lens apparatus integrated with each other. The lens apparatus 520 includes a plurality of optical elements (lens unit) 522 and an aperture stop SP, and it constitutes an optical system (image pickup optical system). The image pickup apparatus body 510 includes an image sensor 512 such as a CMOS sensor. The image sensor 512 is disposed on an imaging plane IP, and it photoelectrically converts an object image (optical image) formed via the optical system to output image data.

The object image passes through the optical system, and it is imaged on the imaging plane IP. In this embodiment, the optical filter (gradation ND filter) in any one of Embodiments 1 to 4 is provided on the aperture stop SP or at least one surface disposed in front of or behind the aperture stop SP. However, this embodiment is not limited thereto, and the optical filter may be provided on other lens surfaces of the optical system.

located at distances r1 and r2 (r1<r2) from the center of the optical surface, respectively, a high-quality blurred image can be obtained by an apodization effect. In addition, by disposing the gradation ND filter of each embodiment in front of and behind the aperture stop SP, the apodization effect can be effectively obtained also for an off-axis light beam, and accordingly a high-quality image can be obtained for an entire region of an image. On the contrary, if a gradation ND filter having characteristics of satisfying T(r1)≤T(r2) is used, peripheral illumination can be corrected.

When the optical filter is provided at this position, reflected light typically becomes stray light, which causes ghost or flare. In the gradation ND filter of each embodiment, however, the reflectance decreases while the transmittance distribution is maintained, and as a result a high-quality image where the ghost or the flare has been reduced for both of light from an image side and light from an object side can be obtained. The cross-sectional view illustrated in FIG. 16 is an example, and the optical filter of each embodiment cannot be applied only to a lens of an image pickup optical system but also applied to various optical systems.

TABLE 5 illustrates numerical values of parameters for the wavelength of 550 nm and the normal incidence with respect to the optical filter in each of Embodiments 1 to 4. Symbol i described in the optical admittance η is an imaginary unit.

TABLE 5

| PARAMETER | EMBODIMENT | | | | RELEVANT CONDITIONAL EXPRESSION |
|---|---|---|---|---|---|
| | 1 | 2 | 3 | 4 | |
| k | 0.2180 | 0.2880 | 0.1090 | 0.1947 | $0 < k \leq 0.5$ (2) |
| $\eta_{air}/Y_0$ | 2.2744 | 2.3169 | 2.1913 | — | $|Re(\eta_{air})/Y_0 - N_{abs}|<0.25$ (4) |
| | −0.2400i | −0.2231i | −0.1626i | | $|Re(\eta_{air})/Y_0 - N_{abs}|<0.15$ (6) |
| $\eta_{sub}/Y_0$ | 2.0042 | 2.1018 | 1.9619 | 2.3253 | $|Re(\eta_{sub})/Y_0 - N_{abs}|<0.25$ (5) |
| | +0.1371i | +0.1944i | +0.1740i | −0.0814i | $|Re(\eta_{sub})/Y_0 - N_{abs}|<0.15$ (7) |
| $N_{abs}$ | 2.19147 | 2.33022 | 2.19147 | 2.19140 | (4) (5) (6) (7) (8) (9) (10) |
| $N_m$@21 | 2.03842 | 2.03842 | 1.7891 | — | $N_{sub} < N_m < N_{abs}$ ($N_{abs} > N_{sub}$) (8) |
| | | | | | $N_{sub} > N_m > N_{abs}$ ($N_{abs} < N_{sub}$) (9) |
| $N_m$@22 | 2.11741 | 2.11741 | — | — | |
| $N_f$@41 | 1.38163 | 1.38163 | 1.96915 | 2.34224 | $1 < N_f < N_{abs}$ (10) |
| $N_f$@42 | 2.26066 | 2.26066 | 1.38163 | 2.10853 | |
| $N_f$@43 | 1.38163 | 1.38163 | — | 1.38299 | |
| $N_{sub}$ | 1.77582 | 1.77582 | 1.51805 | 2.00330 | (8) (9) (10) |
| | | | | | $|N_{sub} - N_{abs}|\leq 0.2$ (13) |
| $N_c$ | — | 1.77582 | — | — | $|N_c - N_{sub}|\leq 0.1$ (11) |

The optical system illustrated in FIG. 16 is a coaxial rotationally-symmetrical optical system. It is preferred that the optical filter having a concentric transmittance distribution as illustrated in FIGS. 15A and 15B is used in this optical system. As illustrated in FIGS. 1A to 1C or FIGS. 6A to 6C, when a region where the thickness of the absorption layer is 0 is provided at the center of the optical filter, the decrease of the transmittance caused by the optical filter can be suppressed and accordingly it is preferable. When the image pickup apparatus 500 includes an autofocus mechanism (AF mechanism) by a phase difference detection method, it is preferred the region where the thickness of the absorption layer is 0 is provided at the center region so that the transmittance of the light beam that is used for phase difference detection does not change.

When a gradation ND filter satisfying T(r1)≥T(r2) is disposed where T(r1) and T(r2) are transmittances at regions The optical filter in each embodiment is easily manufactured and has a high antireflection effect for incident light from a surface side and a substrate side with respect to regions with different transmittances in a substrate plane, and thus generation of ghost, flare, or the like can be reduced. According to each embodiment, the optical filter, the optical system, the image pickup apparatus, and the lens apparatus that are easily manufactured and that have a high antireflection performance for the regions with different transmittances can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SINGS LIST 100, 200, 400 OPTICAL FILTER
1 SUBSTRATE
3 ABSORPTION LAYER (FIRST LAYER)

The invention claimed is:

1. An optical filter having a region where a transmittance changes in a first direction, the optical filter comprising:
a substrate;
a first layer; and
a second layer,
the substrate, the first layer, and the second layer being arranged in this order along a second direction orthogonal to the first direction,
wherein a thickness of the first layer in the second direction changes in the first direction, and
wherein conditional expressions below are satisfied:

$$0.05 \leq k \leq 0.35, \text{ and}$$

$$|Re(\eta_{sub})/Y_0 - N_{abs}| < 0.25,$$

where k is an extinction coefficient of the first layer, $\eta_{sub}$ is an equivalent admittance from air to the second layer for light of 550 nm, $Y_0$ is an admittance in a free space, and $N_{abs}$ is a refractive index of the first layer for light of 550 nm.

2. The optical filter according to claim 1, wherein:
the second layer includes at least two films, and
a thickness of the second layer in the second direction is constant.

3. The optical filter according to claim 1, wherein a conditional expression below is satisfied for light having a wavelength of 550 nm:

$$1 < N_t < N_{abs},$$

where $N_{abs}$ is a refractive index of the first layer and $N_t$ is a refractive index of at least one of films that constitute the second layer.

4. The optical filter according to claim 1, wherein:
the region is a region where the transmittance continuously changes in the first direction, and
the thickness of the first layer continuously changes in the first direction.

5. The optical filter according to claim 1, wherein:
the first direction is an in-plane direction of the substrate,
the second direction is a direction orthogonal to the in-plane direction, and
the extinction coefficient is a value obtained when light having a wavelength of 550 nm is incident on the optical filter.

6. The optical filter according to claim 1, wherein:
the optical filter includes a first region where the transmittance changes, and a second region where the transmittance is constant, and
the first layer is formed in the first region and is not formed in the second region.

7. The optical filter according to claim 1, further comprising an intermediate layer disposed between the substrate and the first layer.

8. The optical filter according to claim 7, wherein a conditional expression below is satisfied for light having a wavelength of 550 nm:

$$|Re(\eta_{air})/Y_0 - N_{abs}| < 0.25,$$

where $\eta_{air}$ is an equivalent admittance from the substrate to the intermediate layer, $Y_0$ is an admittance in a free space, and $N_{abs}$ is a refractive index of the first layer.

9. The optical filter according to claim 7, wherein a conditional expression below is satisfied for light having a wavelength of 550 nm:

$$N_{sub} < N_m < N_{abs}, \text{ or}$$

$$N_{sub} > N_m > N_{abs},$$

where $N_{sub}$ is a refractive index of the substrate, $N_{abs}$ is a refractive index of the first layer, and $N_m$ is a refractive index of at least one of films that constitute the intermediate layer.

10. The optical filter according to claim 1, wherein a conditional expression below is satisfied for light having a wavelength of 550 nm:

$$|N_{sub} - N_{abs}| \leq 0.2,$$

where $N_{sub}$ is a refractive index of the substrate.

11. The optical filter according to claim 1, wherein the first layer has a concentric thickness distribution.

12. The optical filter according to claim 1, wherein the thickness of the first layer increases from a center toward a periphery of the optical filter.

13. The optical filter according to claim 1, wherein the substrate is curved.

14. An optical filter having a region where a transmittance changes in a first direction, the optical filter comprising:
a substrate;
a phase compensation layer; and
a first layer,
the substrate, the phase compensation layer, and the first layer being arranged in this order along a second direction orthogonal to the first direction,
wherein a thickness of the first layer changes in the first direction,
wherein a thickness of the phase compensation layer increases in a direction opposite to an increasing direction of the thickness of the first layer,
wherein a conditional expression below is satisfied:

$$0 < k \leq 0.5,$$

where k is an extinction coefficient of the first layer, and
wherein the thickness of the phase compensation layer changes to satisfy a conditional expression below for light having a wavelength of 550 nm:

$$|OPD/\lambda| \leq 0.3$$

where $\lambda$ is a wavelength of light and OPD is an optical path difference between positions where the thickness of the first layer is minimized and maximized.

15. The optical filter according to claim 14, wherein:
the phase compensation layer is disposed adjacent to the substrate, and
a conditional expression below is satisfied for light having a wavelength of 550 nm:

$$|N_c - N_{sub}| \leq 0.1,$$

where $N_{sub}$ is a refractive index of the substrate and $N_c$ is a refractive index of the phase compensation layer.

16. An optical system comprising a plurality of optical elements including an optical filter according to claim 14.

17. An optical system comprising a plurality of optical elements including an optical filter, the optical filter having a region where a transmittance changes in a first direction, the optical filter including:
a substrates;
a first layer; and
a second layer, the substrate, the first layer, and the second layer being arranged in this order along a second direction orthogonal to the first direction,
wherein a thickness of the first layer in the second direction changes in the first direction, and
wherein conditional expressions below are satisfied:

$0.05 \leq k \leq 0.35$, and $|Re(\eta_{sub})/Y_0 - N_{abs}| < 0.25$, where k is an extinction coefficient of the first layer, $\eta_{sub}$ is an equivalent admittance from air to the second layer for light of 550 nm, $Y_0$ is an admittance in a free space, and $N_{abs}$ is a refractive index of the first layer for light of 550 nm.

18. An image pickup apparatus comprising:
the optical system according to claim 17; and
an image sensor configured to photoelectrically convert an optical image formed via the optical system to output image data.

19. An optical filter having a region where a transmittance changes in a first direction, the optical filter comprising;
a substrate;
an intermediate layer; and
a first layer,
the substrate, the intermediate layer, and the first layer being arranged in this order along a second direction orthogonal to the first direction,
wherein a thickness of the first layer in the second direction changes in the first direction, and
wherein conditional expressions below are satisfied:

$0.05 \leq k \leq 0.35$, and $|Re(\eta_{air})/Y_0 - N_{abs}| < 0.25$, where k is an extinction coefficient of the first layer, $\eta_{air}$ is an equivalent admittance from the substrate to the intermediate layer for light of 550 nm, $Y_0$ is an admittance in a free space, and $N_{abs}$ is a refractive index of the first layer for light of 550 nm.

20. An optical system comprising a plurality of optical elements including an optical filter according to claim 19.

* * * * *